(12) United States Patent
Powell

(10) Patent No.: US 11,663,704 B2
(45) Date of Patent: May 30, 2023

(54) DISTORTION CORRECTION VIA MODIFIED ANALYTICAL PROJECTION

(71) Applicant: Microsoft Technology Licensing, LLC, Redmond, WA (US)

(72) Inventor: Karlton David Powell, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/243,405

(22) Filed: Apr. 28, 2021

(65) Prior Publication Data

US 2022/0366547 A1    Nov. 17, 2022

(51) Int. Cl.
*H04N 7/15* (2006.01)
*G06T 5/00* (2006.01)
*G06T 3/00* (2006.01)
*H04N 5/262* (2006.01)

(52) U.S. Cl.
CPC ............ *G06T 5/006* (2013.01); *G06T 3/0012* (2013.01); *H04N 5/2628* (2013.01); *H04N 7/15* (2013.01)

(58) Field of Classification Search
CPC ... G06T 5/00; G06T 3/00; H04N 7/15; H04N 5/262
See application file for complete search history.

(56) References Cited

U.S. PATENT DOCUMENTS

| | | | |
|---|---|---|---|
| 6,618,494 B1 | 9/2003 | Nonay et al. | |
| 7,058,237 B2 | 6/2006 | Liu et al. | |
| 7,961,980 B2 | 6/2011 | Shih | |
| 8,643,747 B2 | 2/2014 | Chou | |
| 8,687,070 B2 | 4/2014 | Chen et al. | |
| 8,818,132 B2 | 8/2014 | Zhang et al. | |
| 9,412,154 B2 | 8/2016 | Ryu et al. | |
| 9,438,897 B2 | 9/2016 | Barreto et al. | |
| 9,774,837 B2 | 9/2017 | Chang et al. | |

(Continued)

FOREIGN PATENT DOCUMENTS

| | | | |
|---|---|---|---|
| CN | 1873389 A | 12/2006 | |
| CN | 108269234 A | 7/2018 | |
| WO | WO-2006090320 A1 * | 8/2006 | ............... G01J 9/02 |

OTHER PUBLICATIONS

"Non Provisional Application Filed in U.S. Appl. No. 16/667,592", filed Oct. 29, 2019, 46 Pages.

(Continued)

*Primary Examiner* — Melur Ramakrishnaiah
(74) *Attorney, Agent, or Firm* — Alleman Hall Creasman & Tuttle LLP

(57) ABSTRACT

Examples are disclosed relating to applying an analytical geometric projection that has been modified by an amplitude function. One example provides a computing device comprising a logic subsystem and a storage subsystem holding instructions executable by the logic subsystem to receive an image of a scene as acquired by an image sensor, apply a mapping to the image of the scene that maps pixels of the image to projected pixels on an analytical projection that is modified by an amplitude function such that the analytical projection achieves a higher zoom effect on pixels closer to a center of the image compared to pixels closer to an edge of the image, thereby obtaining a corrected image, and output the corrected image.

20 Claims, 18 Drawing Sheets

(56) References Cited

U.S. PATENT DOCUMENTS

| | | |
|---|---|---|
| 10,663,567 B2 | 5/2020 | Fenton et al. |
| 2004/0109080 A1 | 6/2004 | Chan et al. |
| 2005/0105822 A1 | 5/2005 | Narita |
| 2006/0033999 A1* | 2/2006 | Liu .................. G06T 3/0062 359/687 |
| 2006/0209194 A1* | 9/2006 | Liu .................. H04N 5/2628 348/E5.042 |
| 2008/0111912 A1 | 5/2008 | Chen |
| 2008/0165248 A1 | 7/2008 | Wang et al. |
| 2008/0218606 A1 | 9/2008 | Yoda |
| 2008/0218607 A1 | 9/2008 | Shoji et al. |
| 2008/0225117 A1 | 9/2008 | Seo |
| 2009/0009631 A1 | 1/2009 | Hoshi |
| 2009/0051797 A1 | 2/2009 | Yao |
| 2010/0086293 A1 | 4/2010 | Iwane |
| 2011/0026014 A1 | 2/2011 | Mack et al. |
| 2011/0069148 A1 | 3/2011 | Jones et al. |
| 2011/0141323 A1 | 6/2011 | Hyun |
| 2011/0273569 A1 | 11/2011 | Douady et al. |
| 2013/0229482 A1* | 9/2013 | Vilcovsky ............ H04N 7/144 348/14.07 |
| 2013/0335451 A1* | 12/2013 | Tsuji .................. G06T 5/006 345/647 |
| 2015/0109401 A1 | 4/2015 | Kasatani et al. |
| 2015/0192750 A1 | 7/2015 | Shiraishi |
| 2015/0254818 A1 | 9/2015 | Li et al. |
| 2015/0304527 A1 | 10/2015 | Chou et al. |
| 2016/0105630 A1 | 4/2016 | Schaffer et al. |
| 2016/0269629 A1 | 9/2016 | Martin |
| 2017/0301059 A1 | 10/2017 | Kitashou et al. |
| 2019/0012766 A1 | 1/2019 | Yoshimi |
| 2019/0082114 A1* | 3/2019 | Jeon ............... H04N 5/23241 |
| 2020/0259347 A1* | 8/2020 | Pereira .................. G09G 5/10 |
| 2021/0044725 A1* | 2/2021 | Powell ................ H04N 5/217 |

OTHER PUBLICATIONS

"Final Office Action Issued in U.S. Appl. No. 16/582,183", dated Aug. 10, 2020, 8 Pages.

"Final Office Action Issued in U.S. Appl. No. 16/582,183", dated Dec. 9, 2020, 9 Pages.

"Non Final Office Action Issued in U.S. Appl. No. 16/582,183", dated Apr. 2, 2020, 7 Pages.

"Non Final Office Action Issued in U.S. Appl. No. 16/582,183", dated Feb. 11, 2021, 8 Pages.

Cao, et al., "The Two-Dimensional Code Image Tilt Correction Method based on Least Squares Support Vector Machines", In Proceedings of International Conference on Audio, Language and Image Processing, Jul. 7, 2014, pp. 926-930.

Wang, et al., "A new calibration model of camera lens distortion", In Journal of Pattern Recognition, vol. 41, Issue 2, Feb. 2008, pp. 607-615.

Heikkila, et al., "A Four-step Camera Calibration Procedure with Implicit Image Correction", In Proceedings of IEEE Computer Society Conference on Computer Vision and Pattern Recognition, Jun. 17, 1997, pp. 1106-1112.

"Search Report Issued in Netherland Patent Application No. N2025575", dated Mar. 2, 2021, 14 Pages.

"International Search Report and Written Opinion Issued in PCT Application No. PCT/US20/037340", dated Sep. 2, 2020, 12 Pages.

"Office Action Issued in U.S. Appl. No. 16/582,183", dated Apr. 7, 2021, 8 Pages.

"International Search Report and Written Opinion Issued in PCT Application No. PCT/US22/023237", dated Jul. 18, 2022, 13 Pages.

* cited by examiner

DISTORTION CORRECTION VIA MODIFIED ANALYTICAL PROJECTION

BACKGROUND

Cameras are used for communication in many different settings. For example, cameras are commonly used in conference rooms to allow video image data of meetings to be sent to remote locations for others to participate in the meetings. In this manner, people at remote locations can enjoy a more collaborative experience than with audio alone.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to correcting distortion in an image by applying an analytical geometric projection that has been modified by an amplitude function. One example provides a computing device comprising a logic subsystem and a storage subsystem holding instructions executable by the logic subsystem to receive an image of a scene as acquired by an image sensor, apply a mapping to the image of the scene that maps pixels of the image to projected pixels on an analytical projection that is modified by an amplitude function such that the analytical projection achieves a higher zoom effect on pixels closer to a center of the image compared to pixels closer to an edge of the image, thereby obtaining a corrected image, and output the corrected image.

DETAILED DESCRIPTION

Figure 1:
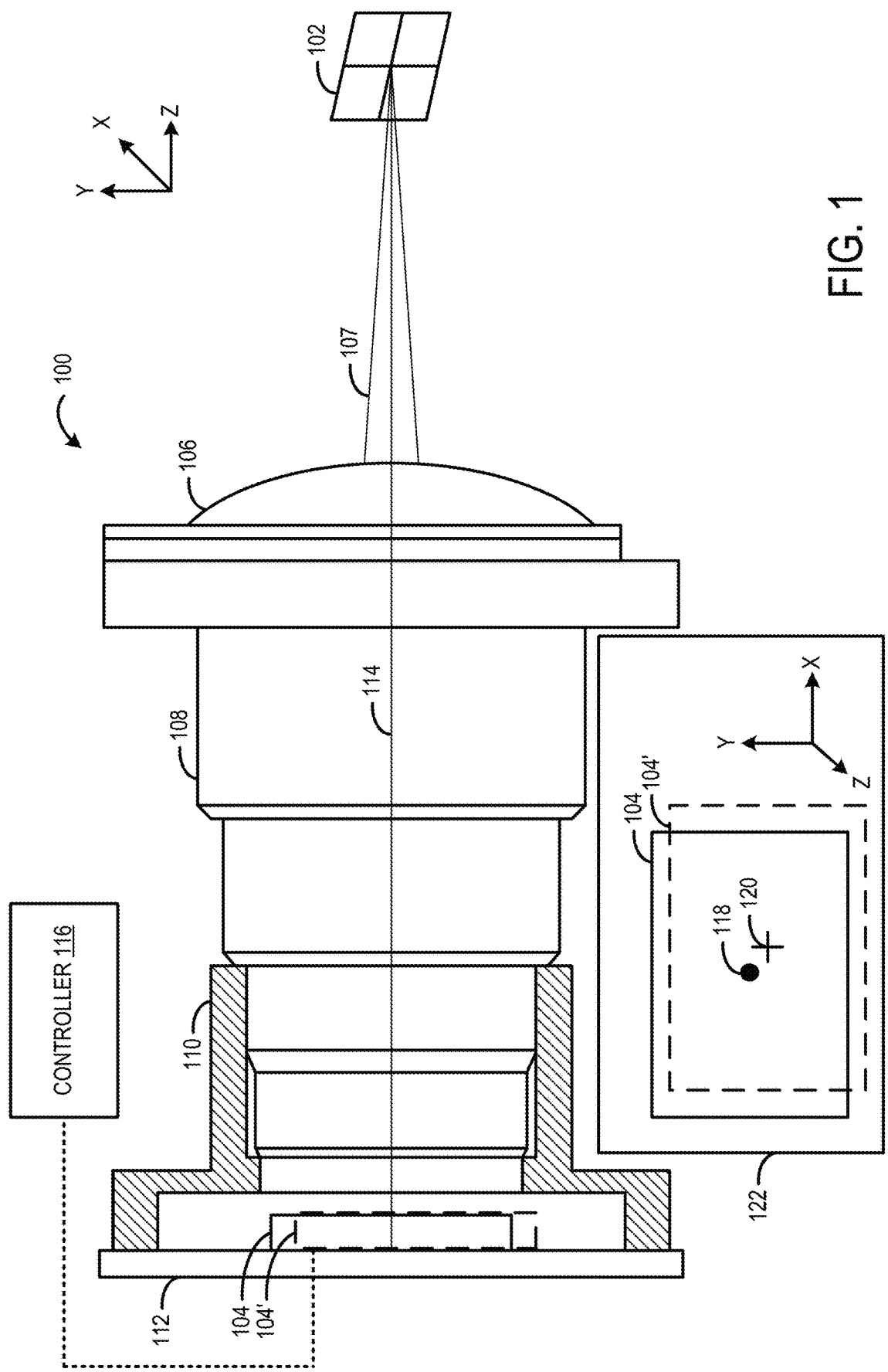
FIG. 1 schematically shows an example camera suitable for use in a videoconferencing system.

A camera captures an image of a scene by directing light onto a flat image sensor. In many settings, a wide-angle camera may be used to image multiple subjects of interest that are spread out in a scene. Such cameras employ a wide-angle lens to capture light from a wide angular field-of-view (FOV), but suffer from various types of optical distortion. Standard low geometric distortion lenses may have a horizontal FOV between 40° and 70° and have mild distortion, whereas wide-angle angle (70°-90° FOV) and ultra-wide-angle (>90° FOV) lenses may have more significant distortion at the edges and corners of the image frame. Furthermore, in some settings, particularly indoors such as a conference room, some subjects of interest may be located at different distances from the camera lens, leading to discrepancies in apparent size of the subjects when imaged. The unnatural appearance of people and other objects in the images may provide for an unsatisfactory experience for remote videoconference participants. Wide angle cameras equipped with low geometric distortion lenses may suffer from trapezoidal stretching at higher field angles, while wide angle cameras equipped with fisheye lenses may suffer from curvature of straight-line objects, such as walls of a room, at higher field angles.

In some distortion correction approaches, a raw image is mapped to an analytical geometric projection that yields a corrected image. The analytical geometric projection may approximate the arrangement of people and/or other objects of interest in the imaged space, such as a cylindrical projection for people arranged in a semi-circle. In some examples, the mapping may be based upon an optical center of a lends of the camera. Likewise, the projection also may be based on a known or approximate distortion function of the lens. In the corrected image, vertically oriented objects in the scene, such as people standing near the sides of the camera FOV, may appear straight and vertically oriented instead of warped and/or leaning, and thus have a more natural appearance. As used herein, the term "raw image" means an image that is generated without any distortion correction and may include monochrome images, color images, and images that have been at least partially processed.

However, some camera placements and arrangements of subjects in the imaged scene may pose challenges to distortion correction. For instance, a videoconferencing camera may be placed at one end of a room, for example high on a wall above, or attached to the top of, a videoconference display, and tilted downwards to capture subjects seated around a conference table. In this example, subjects at a far end of the conference table opposite the camera may be located a relatively far distance from the camera near the center of the raw image, while subjects at the near end of the conference table adjacent to the camera may be located relatively close to the camera near the edges of the raw image. As subjects close to the camera may be located at extreme viewing angles, this may lead to foreshortening effects and/or trapezoidal distortion for these subjects. At the same time, subjects farther from the camera may appear small compared to other subjects. As a result, using an ultra-wide-angle lens in a conference room setting, for example, people in an image standing close to the camera near the sides of the FOV may appear to be warped, standing at non-vertical angles, and/or appear to be unnaturally large, among other distortions. As such, the scene may appear unbalanced to a user. Furthermore, size disparities and various types of distortion may cause faces to be inconsistent across a field of view. This also may pose challenges for facial recognition, gesture recognition, scene understanding, and/or other applications.

Accordingly, examples are disclosed that relate to correcting distortion an image by using a projection mapping that may achieve a more consistent face appearance across a FOV than other corrections. The disclosed examples apply an analytical projection that is modified with an amplitude function such that the projection achieves a higher zoom effect for pixels located near the center of the image compared to pixels located at the edges of the image. The modified analytical projection mapping may preserve aspect ratios on a local scale. The zoom effect and distortion correction provided by the modified projection further may help balance a scene across a FOV, and thus maintain face consistency across the FOV.

In some examples, the analytical geometric projection that is modified with an amplitude function comprises a rectilinear projection. In such a correction, the projection mapping may correct for distortion while maintaining a rectilinear-like appearance. That is, vertical-line objects may appear straight while curvature may be relatively small, locally, for horizontal-line objects near the top or bottom of the corrected image. Additionally, in some examples, the projection mapping further may be based on a sensed camera tilt angle. As such, the mapping may adjust for a vertical angle bias.

Prior to discussing the use of an amplitude function modified by an analytical projection to correct image distortion, an example camera is described with reference to FIG. 1. The camera 100 is configured to image a scene 102. The camera 100 includes an image sensor 104 and a lens 106 positioned to direct object light 107 from the scene 102 onto the image sensor 104. The lens 106 may take any suitable shape and may including any suitable optical material having any suitable optical characteristics. In some implementations, the lens 106 may be a system of two or more lenses or other optical elements. As a more specific example, the lens 106 may be an f-θ lens, which may comprise a known linear or near-linear, with angle, lens distortion function. The use of an f-θ lens in the camera may help to ensure a nearly linear relationship between the image sensor space and the incidence angle, which may be useful for imaging wide-angle FOV. The lens 106, having lens elements held in lens barrel 108, may be maintained in a center fixed position relative to the image sensor 104 via a holder mount structure 110. In some examples, the holder mount structure 110 is a rigid holder structure that fixes the lens barrel 108, and thus all elements in the lens 106 relative to the image sensor 104 along every axis in six degrees of freedom (e.g., x, y, z, tip, tilt, azimuth rotation). For example, a fixed-focus camera may have such an arrangement. In some examples, the holder mount structure 110 may allow movement of the lens barrel 108 relative to the image sensor along one or more axes (e.g., for image stabilization and/or focus, such as by placing an auto-focus voice-coil actuator between lens barrel 108 and holder mount structure 110). In such examples, the lens 106 is still center fixed relative to the image sensor 104 even though the position of the lens 106 may move along the z axis relative to the position of the image sensor 104.

In the illustrated example camera, the lens barrel 108 is operatively coupled to the holder mount structure 110. The holder mount structure 110 is mounted to a printed circuit board (PCB) 112. In one example, the holder mount structure 110 is bonded to the PCB 112 via an adhesive. The image sensor 104 is mounted on the PCB 112 such that an optical axis 114 of the lens 106 is substantially aligned with a center of the image sensor 104. In particular, the lens barrel 108, the holder mount structure 110, and the PCB 112 collectively maintain the lens 106 in optical alignment with the image sensor 104 (e.g., for the case of using a threaded lens barrel 108 and holder mount structure 110, the holder mount structure 110 may be bonded in position relative to PCB 112 to fix x, y, z position and tip/tilt angle while threads may be substantially used to set the focus). Alternatively, as may be the case for using active alignment (AA), pre-focus position may be set by optically, or mechanically, fixing focus position between lens barrel 108 and holder mount structure 110. Once fixed in this manner, the lens and holder assembly may be actively adjusted in all degrees of freedom and bonded with a gap bond between holder mount structure 110 and PCB 112 to fix x, y, final z focus, tip, tilt and azimuth rotation. Further still, a threadless lens holder may first be bonded to PCB, followed by AA positioning and bonding of a lens having threadless lens barrel.

The camera 100 further comprises a controller 116 configured to control the image sensor 104 to acquire images of the scene 102 as well as to perform other control operations of the camera 100 as discussed herein. The controller 116 includes a logic subsystem and a storage subsystem. The logic subsystem includes one or more physical devices configured to execute instructions held by the storage subsystem to enact any operation, algorithm, computation, or transformation disclosed herein. In some implementations, the logic subsystem may take the form of an application-specific integrated circuit (ASIC) or system-on-a-chip (SoC), in which some or all of the instructions are hardware- or firmware-encoded. The logic subsystem and the storage subsystem of the controller 116 are discussed in further detail with reference to FIG. 16.

During the process of manufacturing the camera 100, manufacturing tolerances of the camera 100 may result in camera-to-camera variations in optical alignment of the image sensor 104 and the lens 106 that may result in a position of the image sensor being shifted from an ideal position that is aligned with the lens 106. The image sensor 104' is shown having a position that is shifted relative to the ideal position of the image sensor 104 that is aligned with the lens 106. Moreover, manufacturing tolerances of the lens 106 itself may contribute to variations in optical alignment of the image sensor 104 and the lens 106. As shown in the sidebar 122, the optical axis 114 of the lens 106 is centered at an actual optical center 118 of the lens 106 relative to the image sensor 104 when the image sensor 104 is ideally aligned with the lens 106. However, the actual optical center 118 of the lens 106 is offset from a center 120 of the image sensor 104' when the image sensor 104' has a position that is shifted relative to the ideal position of the image sensor 104. The difference between the center 120 of the image sensor 104' and the actual optical center 118 of the lens 106 may affect the image distortion attributed to the lens.

The actual optical center 118 may vary from camera to camera such that different cameras generate raw images having different distortion based on having different camera-specific optical centers. As such, in some examples, the application of an analytic projection distortion correction to an image may be based upon a determined optical center along with lens nominal distortion data. The optical center may be determined in any suitable manner. As one example, the optical center may be determined on a camera-by-camera basis during manufacturing by projecting a flat field of illumination through lens 106 onto the image sensor 104, and measuring a centroid of an image intensity profile to determine the optical center. Note that if the camera includes lenses that have limited relative illumination roll-off, a live image based pointing measurement including a calibrated test setup having an optical target with positional reference to the lens optical axis, which may be repeatably mounted by use of kinematic mechanical mounting of lens barrel, may be expected to provide higher accuracy for optical center measurement. As another example, a laser beam aligned with the optical axis 114 may be used to measure the optical center 118. In other examples, an analytic projection distortion correction may be based upon any other suitable calibration.

Figure 2:
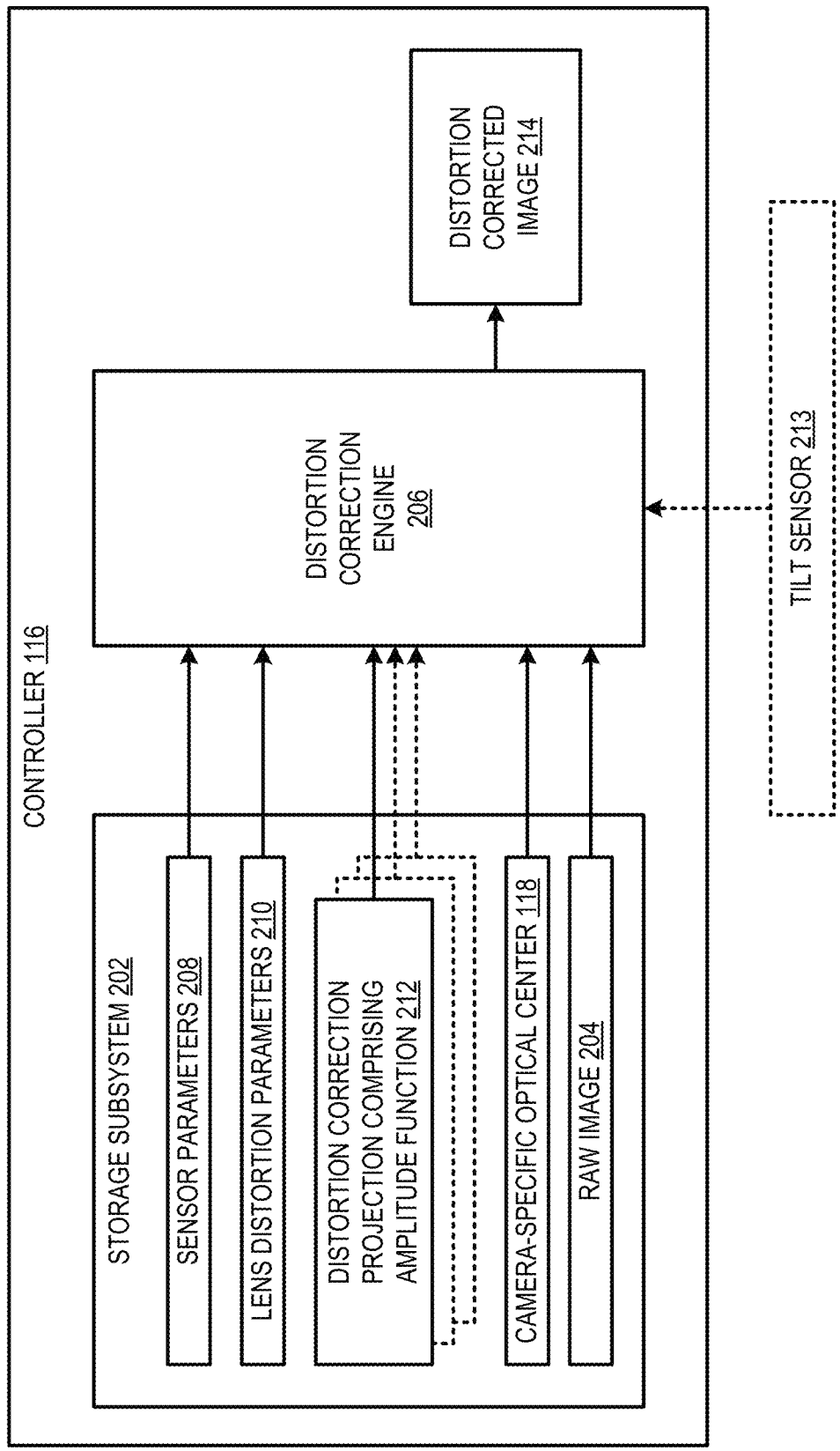
FIG. 2 schematically shows an example camera controller configured to generate distortion-corrected images by applying a projection mapping comprising an amplitude function.

FIG. 2 shows a block diagram of the controller 116 in more detail. The controller 116 is configured to acquire a raw image 204 of a scene via the image sensor 104. The controller 116 may be configured to load the raw image 204 in storage subsystem 202 of the camera 100. The controller 116 is further configured to generate a distortion corrected image 214 from the raw image 204, which may be based on the camera-specific optical center 118 of the camera 100 or other suitable calibration. The measured camera-specific optical center 118 or other calibration may be stored in the storage subsystem 202 (e.g., electrically erasable programmable read-only memory (EEPROM) or other nonvolatile memory) such that the camera-specific optical center 118 or other calibration may be made available for use in performing distortion correction operations. The measured camera-specific optical center 118 may be represented as (x, y) coordinates in a coordinate space of the image sensor 104. Due to lens distortion and/or alignment variances, the measured camera-specific optical center 118 may be offset from an actual center position of the image sensor 104. While use of optical center (OC) position data is not required to perform a distortion corrected image, the magnitude of effective distortion of the corrected image may increase with increase in OC deviation from the origin position used in the projection mapping. As an example, in some applications, small OC error, i.e. on order of <5-10 pixels, may provide sufficient accuracy, while other applications may utilize higher accuracy OC data. Further, the optical center may be offset from the center of sensor in order to facilitate an angular bias in the FOV, e.g. offset of the sensor active area along the vertical dimension so as to bias the vertical FOV cone to image more downward in the scene for a camera mounted at a high level in a room. In such case, OC position data may indicate deviation from the target origin position used in the projection mapping. Further still, an offset region of interest, or image crop, from a smaller region within an oversized image sensor area may be used to achieve offset imaging. As an example, offset imaging may be combined with tilt correction, in order to achieve both VFOV bias angle in combination with tilt compensation.

The controller 116 includes a distortion correction engine 206 configured to translate pixel locations of pixels of the raw image 204 according to a distortion correction projection 212 comprising an amplitude function to generate the distortion corrected image 214. In other examples distortion correction may be performed on another computing device, such as a computer receiving image data from the camera 100, rather than on controller 116. Note that the pixel locations of different pixels in the raw image may be translated and/or interpolated, such as by application of a mesh grid indicating mapping of each integer (x, y) pixel of a distortion corrected image to a floating-point position within the original input image (x', y'), on an individual pixel basis based on the distortion correction projection. As such, in different instances, pixel locations of different pixels may be translated differently (e.g., different direction and/or distance of translation for different pixels), pixel locations of different pixels may be translated the same (e.g., same direction and/or distance of translation for different pixels), and/or pixel locations of some pixels may remain the same between the raw image 204 and the distortion corrected image 214. Furthermore, distortion correction may include stretching and/or compressing portions of an image.

As described in more detail below, the distortion correction engine 206 is configured to perform distortion correction mapping according to a distortion correction projection 212 modified by an amplitude function. The distortion correction engine 206 optionally may utilize the measured camera-specific optical center 118, image sensor parameters 208 and/or lens distortion parameters 210 as inputs. In one example, the image sensor parameters 208 may include a resolution of the image sensor 104 (e.g., a number of pixels included in the image sensor in both x and y dimensions) and a pixel size of pixels of the image sensor 104 (e.g., size of pixel in both x and y dimensions). In other examples, other image sensor parameters may be considered for the distortion correction projection 212. In one example, the lens distortion parameters 210 may include distortion data, such as image real height versus field angle of the lens 106. In other examples, other lens distortion parameters may be considered for the distortion correction projection 212. In some examples, a plurality of distortion correction projections 212 may be stored, e.g., corresponding to different amplitude functions (e.g., conic, cylindrical, parabolic, super-Gaussian), different tilt angles and/or different types of projections (e.g. cylindrical, spherical, and/or rectilinear).

Further, in some examples, distortion correction engine 206 may, in response to an input, change from a current projection mapping to a different projection mapping. For example, controller 116 may receive an input for a zoom request and in response, control distortion correction engine 206 to select a distortion correction projection 212 comprising an amplitude function to apply for the selected level of zoom. As discussed below, a user may be able to select a distortion correction projection having an amplitude function with a different zoom amplitude scaling factor, thus controlling an apparent level of zoom.

In some examples, tilt angle data from a tilt sensor 213 may be used to select a distortion correction projection 212 to apply, such that the tilt angle of the projection corresponds to a tilt angle of the camera as determined from the tilt sensor data. In some examples, a partial tilt correction is applied which may correspond to approximately half of the camera tilt angle, e.g., an analytical projection comprising a tilt parameter of 8.5° may be used when a camera tilt angle is 17°. Applying a partial tilt correction may avoid foreshortening effects on subjects near the camera while still providing suitable distortion correction. The tilt sensor 213 may be incorporated into the camera or into a computing device comprising the camera, as examples. Further, tilt parameter may be provided by use of dedicated mechanical camera mount having a known tilt angle with reference to the lens optical axis. In yet other examples, the tilt angle may be provided as a user input, rather than determined from tilt sensor data. It should be noted that other geometric distortion correction projections not illustrated herein are envisioned to be compatible with tilted distortion correction, such as toroidal projection or hybrid projections such as upper portion cylindrical and lower portion toroidal or spherical, having transition at equatorial line. Further, the geometric distortion correction projection compatible with tilted distortion correction may include a parabolic profile along the vertical FOV which is radially swept, or curved, along the horizontal FOV. Other geometric distortion correction direct projections compatible with tilted distortion correction may include a projection surface which is linear along the vertical and curved along the horizontal, or curved sheet surface, whereas the curved dimension may include a conic profile, such as a cylindrical or parabolic or other conic profile, or a super-Gaussian profile.

The sensor parameters 208 and the lens distortion parameters 210 may be known a priori for the particular type of camera configuration that uses the lens 106 and the image sensor 104. For example, the sensor parameters 208 and the lens distortion parameters 210 may be the same for every camera in a particular manufacturing lot, whereas each camera of the particular manufacturing lot may have a different measured camera-specific optical center due to variations in manufacturing of the cameras. In various implementations, sensor parameters 208 and lens distortion parameters 210 may be stored in storage subsystem 202, and/or hard coded into the distortion correction algorithm(s).

The distortion correction projection 212 defines a relationship between the pixel locations of the raw image 204 and the translated pixel locations of the distortion corrected image 214 as an inverse function in which the sensor coordinates are mapped to projection plane and/or surface coordinates of the distortion correction projection 212. As mentioned above, the distortion correction projection 212 comprises an amplitude function that achieves a higher zoom effect on pixels closer to the center of the image compared to pixels closer to an edge of the image.

Figure 3:
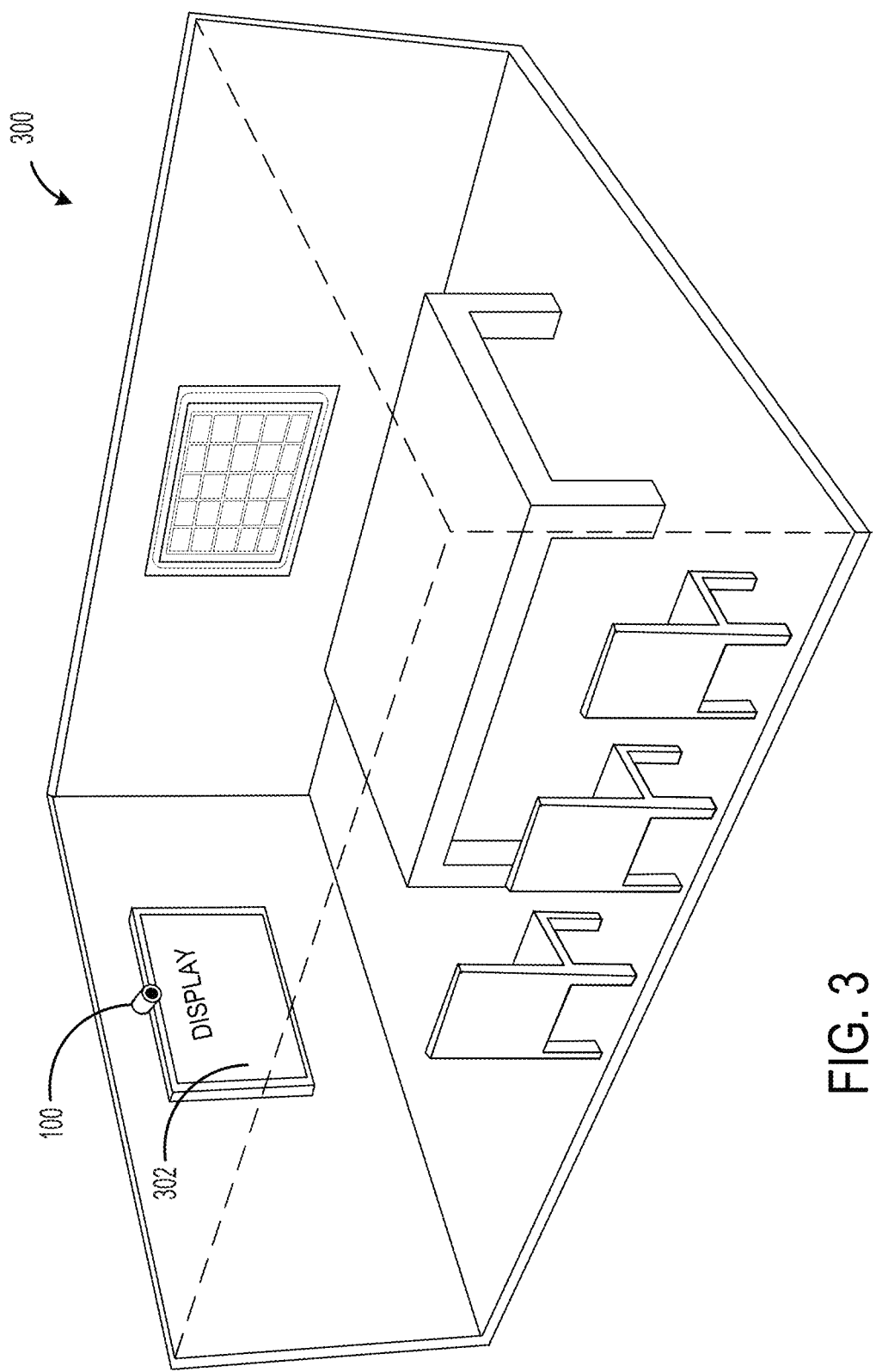
FIG. 3 shows an example conference room comprising a camera arranged with a downward pitch angle.

FIG. 3 shows an example conference room 300 comprising a videoconferencing display and camera, in which camera 100 is placed to a side of display 302 with a downwardly tilted pitch angle. In FIG. 3, the camera 100 is located above the display 302, but may be located to a different side of the display 302 in other examples, including left, right, or below in some examples.

As discussed above, a distortion correction can comprise applying a mapping that maps pixels of an image onto an analytical projection that has been modified by an amplitude function. The analytical projection may comprise a rectilinear, cylindrical, or spherical projection.

Figure 4:
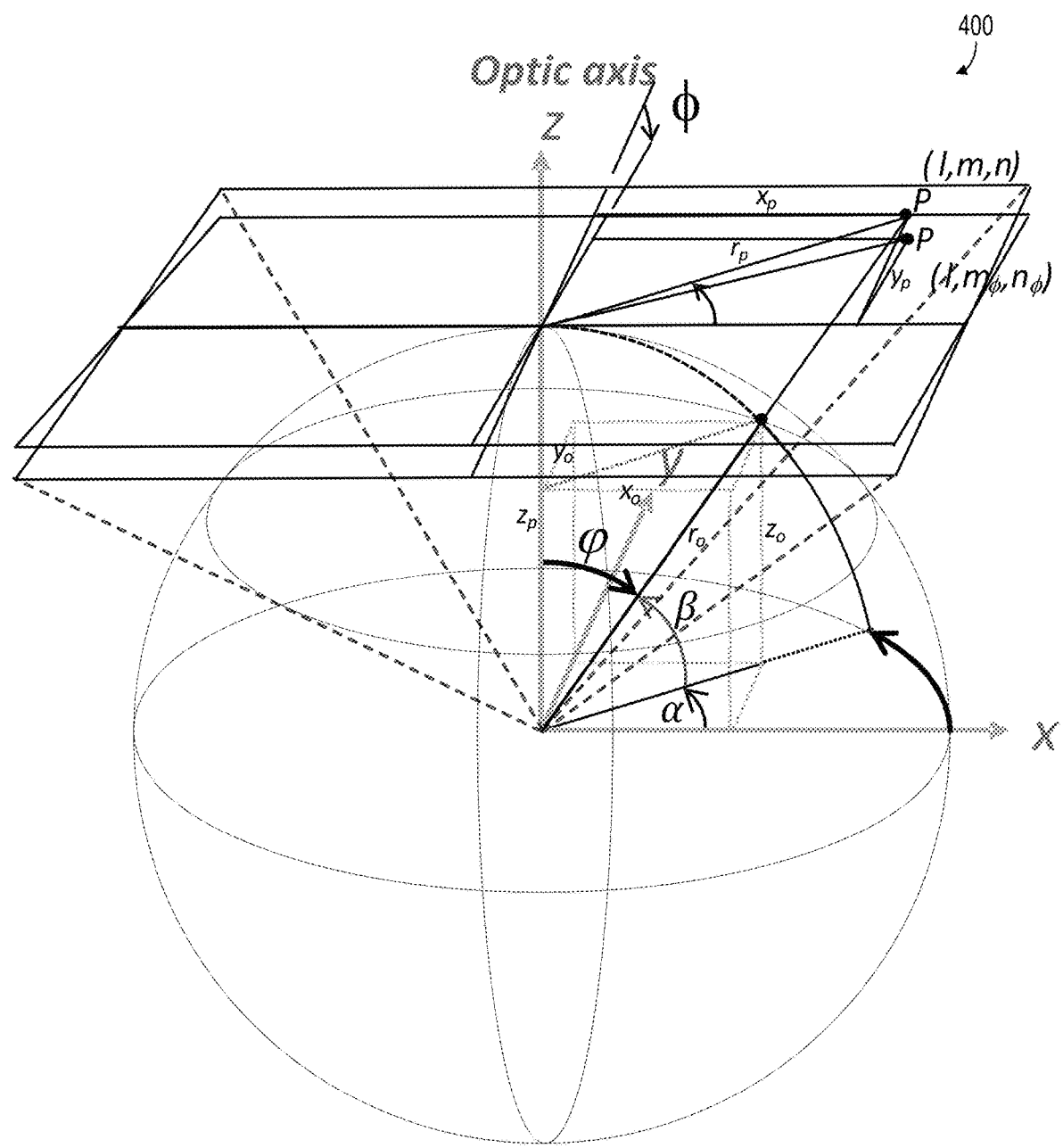
FIG. 4 shows an example rectilinear projection based in part on a tilt angle.

FIG. 4 shows a geometric representation of an example rectilinear projection 400 for pitch tilt angle $\phi$ (prior to modification by an amplitude function). The rectilinear projection maps sensor coordinates in image sensor space to projection plane coordinates of a tilted rectilinear projection plane. Prior to the mapping, the pixel grid of the raw image is parameterized into corresponding physical dimensions and optionally may be shifted based on the measured camera-specific optical center.

The image sensor coordinates are represented by $(x_s, y_s)$ for the raw image. Projection distance $z_p$ may be used as a scaler for setting the field of view captured within the corrected image pixel positions. For example, for a real height $H_{Re}$ of the horizontal edge of the image sensor, the corrected image may be set to subtend and include a target horizontal field of view (HFOV) by setting $z_p$ as:

$$z_p = \left(\frac{1}{\cos(\phi)}\right)\left(\frac{H_{Re}}{\tan\left(\left(\frac{\pi}{180}\right)\left(\frac{HFOV}{2}\right)\right)}\right).$$

The rectilinear projection defines the relationship between the image sensor coordinates and the projection plane coordinates (coordinates on the plane represented by position $(x_p, y_p)$, all points which have been rotated by tilt angle $\phi$ about a point located a distance $z_p$ along z axis, thus positions in the corrected image) as an inverse function in the form of, $x_s(f, x_p, y_p, z_p, \phi)$ & $y_s(f, x_p, y_p, z_p, \phi)$.

For a point P=(l, m, n) on the untilted plane, relative to the pivot point along z axis, $l=x_p$, $m=y_p$, and $n=0$. For a given tilt angle $\phi$, the lateral position $x_o$ remains constant. Including tilt $\phi$ of the plane, point P moves to $P_\phi=(l_\phi, m_\phi, n_\phi)$, where $l_\phi=x_p$, $m_\phi=n \sin\phi+m \cos\phi=y_p \cos\phi$, and $n_\phi=n \cos\phi-m \sin\phi=-y_p \sin\phi$, thus coordinates with respect to XYZ origin become $x_o=l=x_p,$ $y_o=m_\phi=m \cos\phi=y_p \cos\phi,$ and $z_o=z_p-n_\phi(=z_p-(-m \sin\phi)=z_p+y_p \sin\phi.$ Given $(x_o, y_o, z_o)$ above, the Field Angles are expressed as:

$$\varphi = \sin^{-1}\left(\frac{\sqrt{x_o^2+y_o^2}}{\sqrt{x_o^2+y_o^2+z_o^2}}\right)$$

while $r_p=\sqrt{x_p^2+y_p^2}$ and $z_p$=distance scaler to plane. For the projection plane coordinates $(x_p, y_p)$:

$x_p=r_p \cos(\theta)$ where $$\cos(\theta) = \frac{x_p}{r_p} = \frac{x_p}{\sqrt{x_p^2+y_p^2}}$$

$y_p=r_p \sin(\theta)$ where $$\sin(\theta) = \frac{y_p}{r_p} = \frac{y_p}{\sqrt{x_p^2+y_p^2}}$$

The radius $r_s$ on the image sensor from an angle to the image height may be represented as a function $r_s(\varphi)$. For example, this relationship may be determined via a distortion lookup table which may be used to interpolate a radial image height for any given field angle, a fit equation, or estimated with a parabolic percentage (p) distortion from a f-θ at Field Angle. The radius $r_s$ may be determined as follows:

$$r_s(\varphi) = f\varphi_D(\varphi) \sim f\left(\varphi + \frac{p\varphi^3}{\varphi_o^2}\right)$$

For Field Angles φ in radians $$\varphi = \sin^{-1}\left(\frac{\sqrt{x_o^2 + y_o^2}}{\sqrt{x_o^2 + y_o^2 + z_o^2}}\right)$$

The distortion lookup table may be defined as follows:

$$\varphi_D(\varphi) = LUT(\varphi) = \varphi \frac{H_{Re}(\varphi)}{H_{Ref}(\varphi)}$$

For the sensor coordinates $(x_s, y_s)$, including rotation due to tilt angle $\phi$:

$$y_s = f\varphi_D(\varphi)\left(\frac{y_o}{\sqrt{x_o^2 + y_o^2}}\right) \sim f\left(\varphi + \frac{p\varphi^3}{\varphi_o^2}\right)\left(\frac{y_o}{\sqrt{x_o^2 + y_o^2}}\right)$$

$$x_s = f\varphi_D(\varphi)\left(\frac{x_o}{\sqrt{x_o^2 + y_o^2}}\right) \sim f\left(\varphi + \frac{p\varphi^3}{\varphi_o^2}\right)\left(\frac{x_o}{\sqrt{x_o^2 + y_o^2}}\right)$$

As mentioned above, such a geometric analytical projection may leave some subjects of interest warped and/or result in size disparities amongst various subjects of interest in some scenarios. Referring again to the conference room example, subjects near the center of the image may appear small compared to other subjects, while subjects near the edges of the image may appear to be leaning and/or suffer from trapezoidal distortion. To help correct these distortions, the amplitude function modifies the projection mapping by pulling some mapping points away from the edge towards an origin, and/or pushing other mapping points away from the origin towards an edge. The origin may be referred to as a central mapping point of reference, which may be a center of the raw image, a focal point in the image of the scene, or other reference point. In some examples, the origin may be vertically offset based on the height of the camera. In some examples the origin may be a user-selected central mapping point. In some examples, the origin may match the camera specific optical center. In some examples, the origin may be vertically offset from the camera specific optical center.

Figure 5:
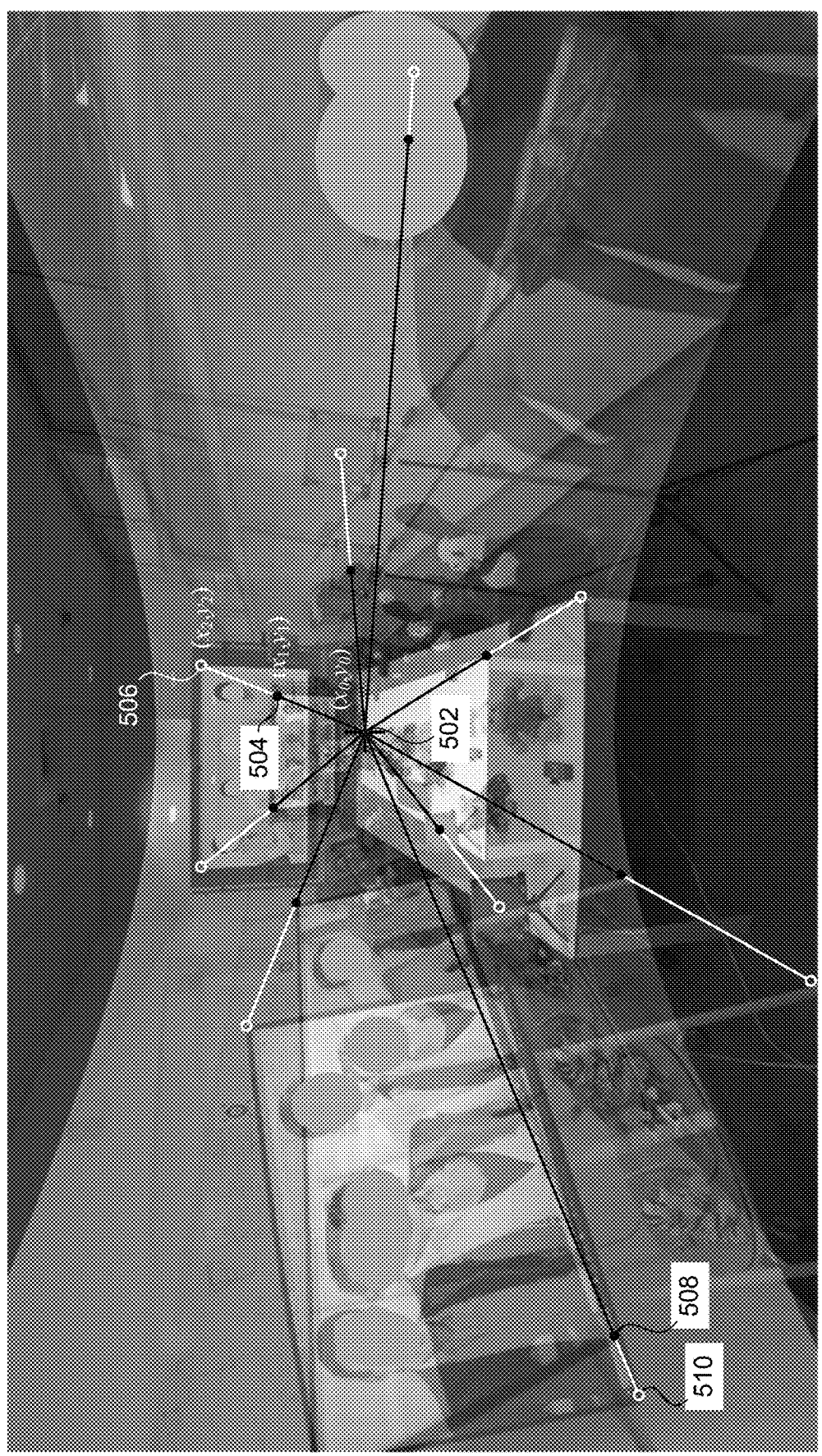
FIG. 5 shows superimposed images of a scene including a first image obtained using a rectilinear projection and a second image obtained using a projection modified by an amplitude function.

FIG. 5 illustrates an example modification of a rectilinear projection via an amplitude function. More particularly, FIG. 5 shows two example images superimposed: a first image obtained using an unmodified rectilinear projection (or modified rectilinear projection with amplitude set to zero) and a second image obtained using a rectilinear projection that has been modified with an amplitude function. In FIG. 5, black lines are shown extending from an origin 502 to a selection of mapping points in the first image. For example, mapping point 504 is located at corner of a display. FIG. 5 also shows white lines extending from origin 502 to updated projection points in the second image corresponding to the mapping points. For example, updated projection point 506 is located at a display corner in the second image corresponding to the display corner of mapping point 504. As shown in FIG. 5, the amplitude function has the effect of pushing pixels away from origin 502. Further, the type of lens distortion of lens used in the camera being corrected may be selected to provide improved resolve of pixels in the central region that has zoom appearance, e.g. for wide FOV applications, the post dewarp pixel density of central zoomed region may benefit from use of a wide angle fisheye lens (f-theta) over low TV distortion lens (gnomonic, or f-tan(theta)).

An example modification of a projection via an amplitude function will now be described with reference to the rectilinear projection, but any suitable geometric analytical projection may be used. First, consider a mapping point $(x_1, y_1)$ in the analytical projection and an origin $(x_0, y_0)$. The amplitude function modifies the horizontal position $x_1$ by a factor c to a modified position $x_2$, where $x_2 = cx_1$. Next, $y_2$ is chosen such that the slope of the line from $(x_2, y_2)$ to the origin matches the slope of the line from $(x_1, y_1)$ to the origin:

$$\frac{y_2 - y_0}{x_2 - x_0} = \frac{y_1 - y_0}{x_1 - x_0}$$

where $(x_1, y_1)$ is a point in the analytical projection, $(x_2, y_2)$ is an updated projection point, and $(x_0, y_0)$ is the origin (central mapping point of reference). For example, FIG. 5 shows the location of updated projection point 506 where the slope from updated projection point 506 to origin 502 (i.e., slope of white line) is the same as the slope from mapping point 504 to origin 502 (i.e., slope of black line). Rather than scaling each point by a constant factor c, a function c(x) is used, thus $x_2 = c(x)x_1$. Solving the above for $y_2$ yields a solution for the updated projection point in terms of the function c(x).

$$x_2 = c(x)x_1,$$

$$y_2 = y_0 + (c(x)x_1 - x_0)\left(\frac{y_1 - y_0}{x_1 - x_0}\right),$$

where c(x) is a non-linear function.

The function c(x) determines the relative zoom effect for pixels in the projection mapping. For example, in FIG. 5 near the center of the image, c(x) may be relatively large as updated projection point 506 is almost twice as far from origin 502 as mapping point 504. However, near the edge of the image, c(x) may be smaller as updated projection point 510 is relatively close to mapping point 508. As such, a higher relative zoom effect may be achieved for pixels closer to the center of the image. The rectilinear projection discussed above (FIG. 4) may be modified to include the non-linear re-mapping of the x-grid axis values, thus adding a mapping from $(x_1, y_1)$ to $(x_2, y_2)$, as illustrated in FIG. 5. As a result, a projection mapping that maps a sensor pixel to $(x_1, y_1)$ can be modified by an amplitude function to instead map the sensor pixel to $(x_2, y_2)$. The projection mapping may comprise a direct mapping or indirect mapping. In a direct mapping, the amplitude function modifies the projection surface, to which pixels are projected. In an indirect mapping, the amplitude function modifies the grid positions, or mapping, within the projection plane.

Determination of the amplitude function may be based on a depth profile, which may approximate subjects of interest in a scene. The depth profile may be a curved surface defined by a conic function (e.g., cylindrical, elliptical, parabolic), a super-Gaussian function, or other suitable function. As one example, a conic profile can be defined as:

$$z(A, v, w, k_o, x) = v + A \frac{\left(\frac{w}{1+\sqrt{-k_o}} - \frac{x^2}{w\left(1+\sqrt{1-\frac{(1+k_o)x^2}{w^2}}\right)}\right)}{\left(\frac{w}{1+\sqrt{-k_o}}\right)}$$

where z is the profile depth, A is the sag, v is the edge height, w is the edge width, $k_o$ is an effective conic constant, and x is the horizontal position across the x-dimension. The edge width and edge height are defined as:

$$w = cR_o \sin\left(\left(\frac{\pi}{180}\right)\left(\frac{HFOV}{2}\right)\right)$$

$$v = cR_o \cos\left(\left(\frac{\pi}{180}\right)\left(\frac{HFOV}{2}\right)\right)$$

where $R_o$ is a nominal radius, c is an edge placement factor, and HFOV is the horizontal field of view. The parameters w and v determine the edges of the field of view as defined by a curved analytical projection surface. The sag of the projection profile is:

$$A = (A_o - (c-1))R_o\left(1 - \cos\left(\left(\frac{\pi}{180}\right)\left(\frac{HFOV}{2}\right)\right)\right)$$

where $A_o$ is a scaling factor which affects the zoom (magnification) amplitude, described in more detail below. In many of the examples presented herein, HFOV≈136°, but any camera with any suitable FOV may be used.

The effective conic constant $k_o$ may be set based on a desired profile shape and field-of-view. The effective conic constant can be defined as:

$$k_o(k, HFOV) = -\left(\cos\left(\left(\frac{HFOV}{2}\right)\left(\frac{\pi}{180}\right)\right)^2 - k\right)$$

where k is a function parameter input controlling the conic shape, and HFOV is the horizontal field-of-view. If k is set to 0 the resulting profile will be cylindrical, whereas k=−1 will result in a parabolic profile. Other values may yield elliptical shapes of varying eccentricity. For example, for a cylindrical profile shape and 136° horizontal field of view, $k_o(0,136°)=-0.14033$ and this value is used to generate the depth profile using the equations above. Likewise, for a parabolic shape, $k_o(-1,136°)=-1.14033$ may be used to generate the depth profile.

In other examples, the depth profile can be based on a super-Gaussian function. The super-Gaussian profile depth z can be defined as:

$$z(A_o, R_o, T_{fwhm}, m, w_o, x_{edge}, z_{edge}, v_o, x) =$$
$$z_{edge} + A_o R_o e^{-\left(\frac{1}{2}\right)\left(\frac{Abs\left(\frac{xw_o}{x_{edge}}\right)\left(2Log(2)^{(1/2m)}\right)}{T_{fwhm}}\right)^{2m}} - v_o$$

where $T_{fwhm}$ is the full-width at half-max, m is a parameter that determines the sharpness of the profile, $x_{edge}$ is the x-position at the edge, $z_{edge}$ is the z-position at the edge, $w_o$ is the profile normalized width, $v_o$ is the function height, and the other variables are as defined above. The x and z positions at the edge are:

$$x_{edge} = cR_o \sin\left(\left(\frac{\pi}{180}\right)\left(\frac{HFOV}{2}\right)\right)$$

$$z_{edge} = cR_o \cos\left(\left(\frac{\pi}{180}\right)\left(\frac{HFOV}{2}\right)\right)$$

where $R_o$ is the nominal radius, c is the edge placement factor, and HFOV is the horizontal field of view as above. The function height $v_o$ is:

$$v_o = A_o R_o e^{-\left(\frac{1}{2}\right)\left(\frac{Abs(w_o)\left(2Log(2)^{(1/2m)}\right)}{T_{fwhm}}\right)^{2m}}$$

which is the height at the profile normalized width $w_o$. Finally, the sag of the super-Gaussian projection profile is $v_{sag} = A_o R_o - v_o$. In other examples, other suitable depth profiles may be used.

Figure 6:
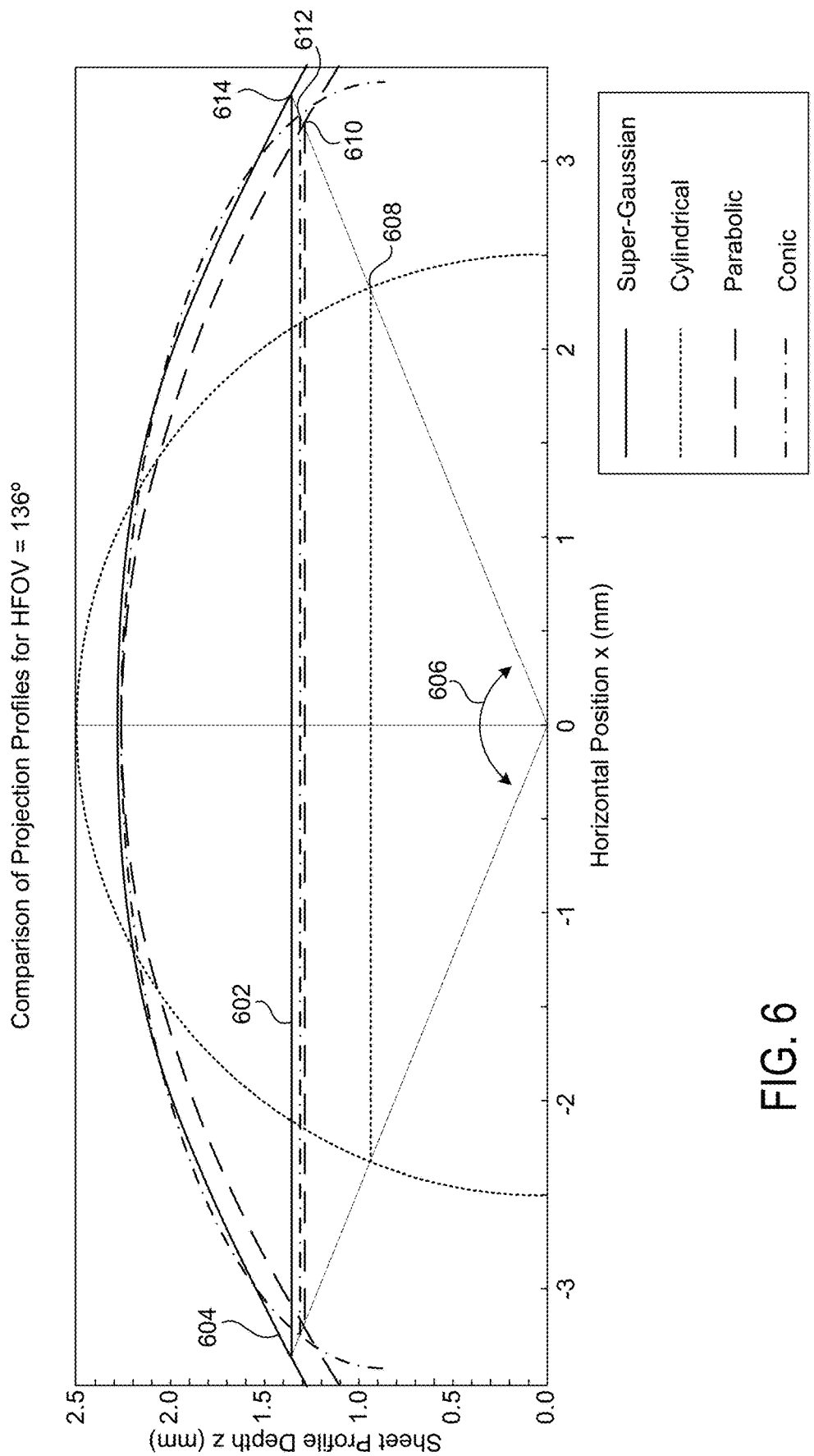
FIG. 6 shows a comparison of various projection profiles for a horizontal field-of-view of 136°.

FIG. 6 shows example depth profiles comprising a super-Gaussian profile, a cylindrical profile, a parabolic profile, and a general conic (elliptical) profile. Such depth profiles are generated using the equations above and may be used in a direct mapping or indirect mapping. In the direct mapping case, a depth profile may be used directly as a projection surface for the analytical projection. For example, a rectilinear projection mapping that projects onto a plane 602 may be modified by a super-Gaussian amplitude function to instead project onto super-Gaussian profile 604. In the indirect mapping case, a depth profile may be indirectly converted into a zoom amplitude function within a rectilinear plane. For example, super-Gaussian profile 604 may be converted into a zoom amplitude function within rectilinear plane 602.

A distortion correction projection may be precomputed and stored as a pixel mapping function (a mesh file) that is applied to pixels in the raw image to produce the distortion corrected image. In some examples, the distortion correction projection may be precomputed for each of a plurality of pitch angles. In still further examples, other geometric analytical projections may be used, such as a cylindrical projection or a spherical projection.

In some examples, a camera may be configured to be used with multiple different pitch angles. For example, a camera may have a pivoting joint at which a camera body attaches to a mount. For a camera incorporated into the body of a device (e.g. a camera positioned in a bezel of a display), the device, or a mount for the device, may include a similar joint. Likewise, a device incorporating a camera, such as a display, may have different pitch angles when mounted to a stand compared to a wall. Thus, to allow appropriate tilted projections to be applied, the camera, device incorporating the camera, and/or a camera mount, may include a tilt sensor (e.g. an inertial motion sensor, rotational encoder incorporated into the pivot joint, etc.) to allow sensing of a pitch tilt angle. Based upon a sensed pitch tilt angle, a corresponding projection mapping may be applied to correct images. As discussed above, in some examples a projection mapping corresponding to a partial tilt correction may be applied.

In the examples shown, the field-of-view 606 comprises a HFOV=136°. The depth profiles intersect the field-of-view at different edge points (e.g., edge points 608, 610, 612, 614). The location of these edge points is dependent on the edge placement factor c, described above. The edge placement factor c, the effective conic constant $k_o$, the zoom amplitude $A_o$, and other parameters may be used to adjust the shape of the depth profile. In particular, zoom amplitude $A_o$ may be adjusted to achieve different levels of zoom effect in the modified analytical projection. In some examples, the profile, parameters, and/or zoom amplitude may be optimized for a given HFOV.

Figure 7:
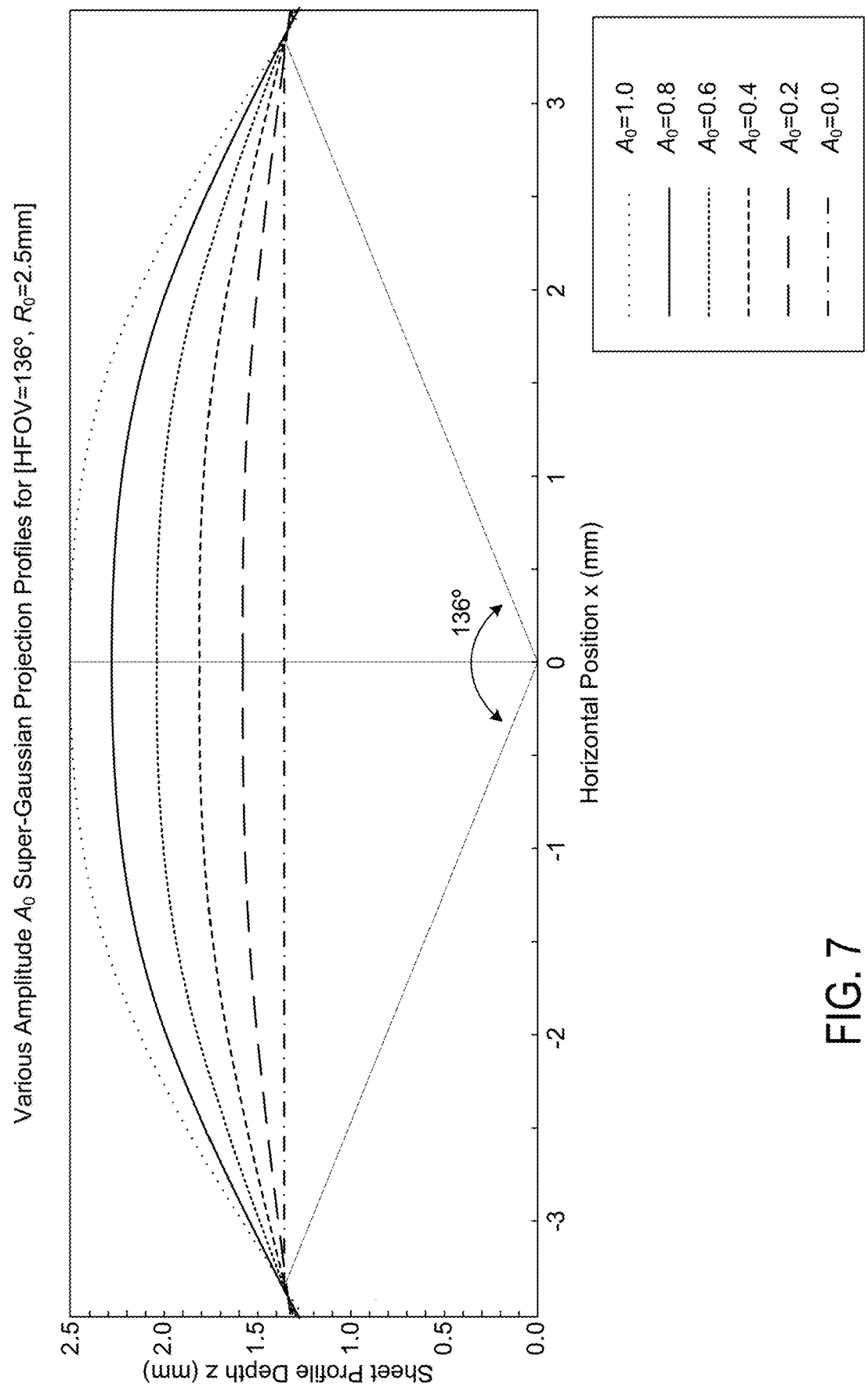
FIG. 7 shows a comparison of super-Gaussian projection profiles for various zoom amplitude values.

FIG. 7 shows example super-Gaussian profiles for various zoom amplitude values $A_o$. When $A_o=0$ the profile is flat, which corresponds to a rectilinear projection. When $A_o=1$ the profile extends to the nominal radius $R_o$ at the center of the HFOV. The profile depth is correlated to the zoom effect. For horizontal positions near x=0, the profile is deeper and therefore the zoom effect is greater compared to horizontal positions close to the edges. Further, for larger values of $A_o$, the depth profile has a greater depth at the center of the HFOV, while for smaller values of $A_o$, the depth profile is relatively less deep. As such, pixels close to the center of the image may appear magnified to a greater degree when using a profile with a higher zoom amplitude $A_o$ compared to the apparent magnification when using a profile with a smaller $A_o$ value. While only five profiles are shown for five non-zero $A_0$ values, it will be understood that any suitable amplitude scaling factor $A_0$ may be used. In some examples, a super-Gaussian amplitude function is used having $A_0$ between 0.7 and 0.9, while in other examples any other suitable value can be used for $A_0$.

In some examples, the amount of zoom amplitude may change, e.g., in response to a user input request. In other examples, the amount of zoom amplitude may be fixed. Since the amount of zoom amplitude and zoom function profile may be optimized for a given maximum HFOV, in some examples, the zoom amplitude is maintained and scaled such that the appearance may be consistent for a variety of changes in HFOV and/or tilt. As such, the zoom amplitude may change based on a change in HFOV. In still other examples, the zoom profile function may be used to purposely change the appearance of image content as if imaged from different z vantage points. For example, a zoom profile function may be chosen to make a wide-angle scene image appear as if captured from a greater distance away and with greater zoom magnification, although the image of scene is captured by a wide-angle camera and at closer distance.

As discussed above, the depth profiles may also be converted to a zoom function to be used within a rectilinear projection plane, thereby providing an indirect mapping that can be applied. The edge-to-edge sag functions of the depth profiles can be normalized and inverted to obtain relative position factor mappings that can be used to modify an analytical projection. The edge-to-edge sag function equation for the conic profile is:

$$z(A, w, k_o, x) = A \frac{\left(\frac{w}{1+\sqrt{-k_o}} - \frac{x^2}{w\left(1+\sqrt{1-\frac{(1+k_o)x^2}{w^2}}\right)}\right)}{\left(\frac{w}{1+\sqrt{-k_o}}\right)}$$

where A is the sag, w is the edge width, $k_o$ is an effective conic constant, and x is the horizontal position across the x-dimension. Similarly, edge-to-edge sag function equation for the super-Gaussian profile is:

$$z(A_o, R_o, T_{fwhm}, m, w_o, x_{edge}, v_o, x) = A_o R_o e^{-\left(\frac{1}{2}\right)\left(\frac{Abs\left(\frac{xw_o}{x_{edge}}\right)(2Log(2)^{(1/2m)})}{T_{fwhm}}\right)^{2m}} - v_o$$

where the parameters are the same as defined above.

Figure 8:
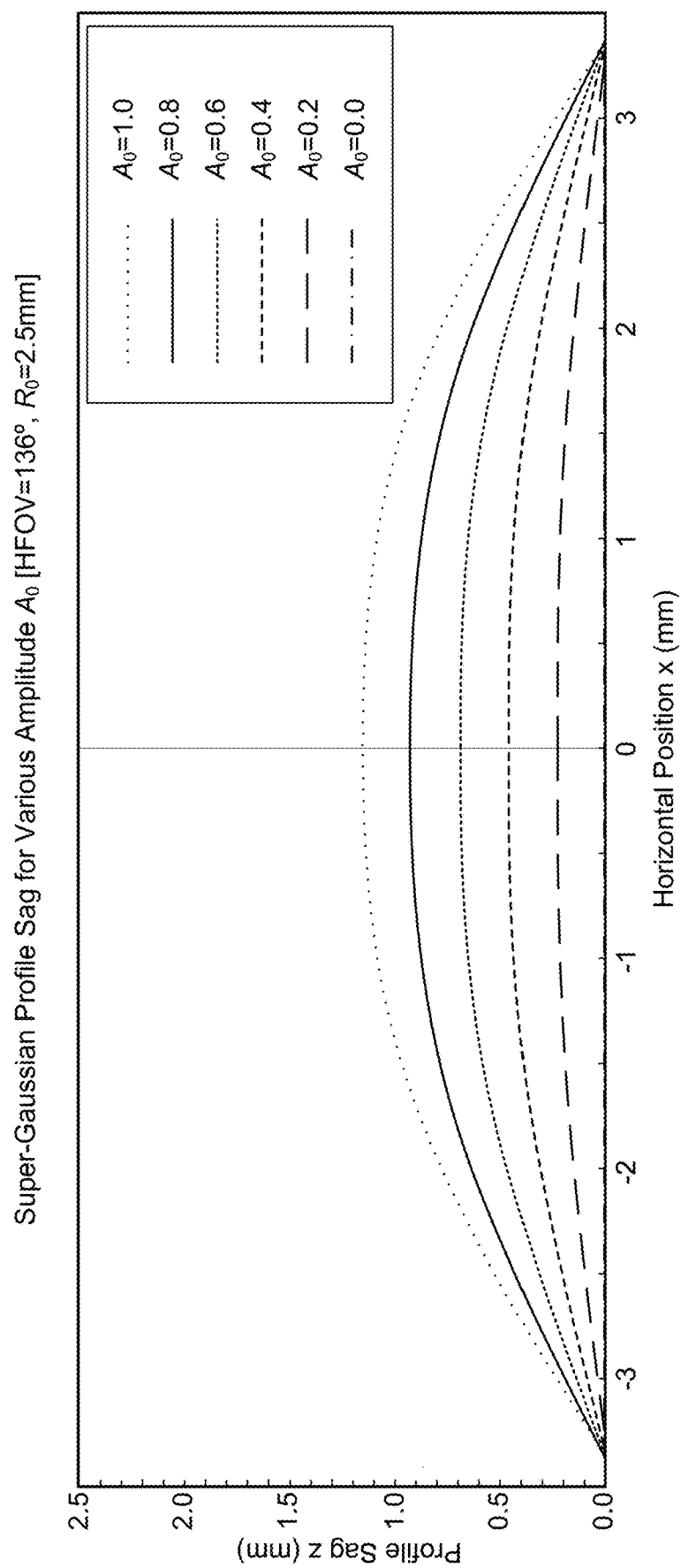
FIG. 8 shows a comparison of super-Gaussian profile sag functions for various zoom amplitude values.

FIG. 8 shows super-Gaussian profile sag for the various profiles of FIG. 7 that may be obtained using the equations above. In the example shown, the HFOV is 136° and the nominal radius $R_o$ is 2.5 mm. At the center of the field of view (x=0), the profile sag z is greater for sag functions with larger zoom amplitude values $A_o$.

Next, the above equations for the sag profiles can be normalized with respect to amplitude and width. For the conic sag profile, one can normalize the edge width by either setting w=1 or by introducing w factor to x as x→wx. The normalized function for the conic sag profile is:

$$z(A_o, w, k_o, x) = A_o \frac{\left(\frac{w}{1+\sqrt{-k_o}} - \frac{(wx)^2}{w\left(1+\sqrt{1-\frac{(1+k_o)(wx)^2}{w^2}}\right)}\right)}{\left(\frac{w}{1+\sqrt{-k_o}}\right)}$$

where z is the normalized profile depth, $A_0$ is the amplitude scaling factor, and w is the width of the conic profile as defined above.

Figure 9:
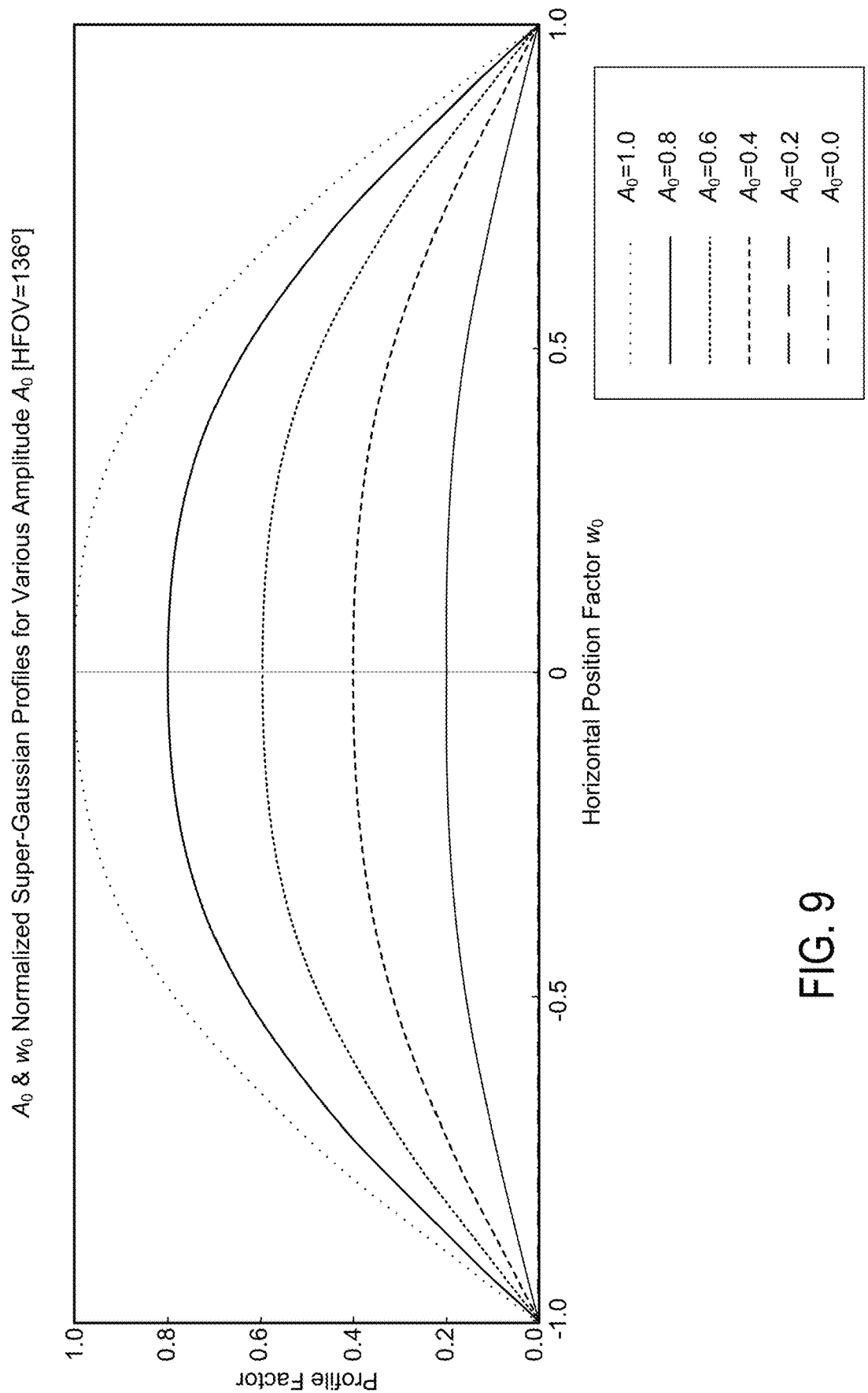
FIG. 9 shows a comparison of super-Gaussian profiles that have been normalized for zoom amplitude and width.

Similarly, the super-Gaussian sag profile can be normalized with respect to amplitude and width by setting $x_{edge} \to 1$ and $R_o \to 1$. The normalized function for the super-Gaussian sag profile is:

$$z(A_o, T_{fwhm}, m, w_o, v_o, v_{sag}, x) = A_o \left( A_o e^{-\left(\frac{1}{2}\right)\left(\frac{Abs(xw_o)(2Log(2)^{(1/2m)})}{T_{fwhm}}\right)^{2m}} - v_o \right)/v_{sag}$$

for $$v_o = A_o e^{-\left(\frac{1}{2}\right)\left(\frac{Abs(w_o)(2Log(2)^{(1/2m)})}{T_{fwhm}}\right)^{2m}}$$

and $v_{sag} = A_0 - v_o$, where $A_o$ is the zoom amplitude factor. FIG. 9 shows the normalized super-Gaussian sag profiles for various amplitude scaling factors from 0 to 1.0.

Next, the normalized sag profiles are inverted with a unity offset to generate a relative position factor mapping that can be applied within the rectilinear plane. The equation for the normalized, offset, inverted conic profile is:

$$c(x) = 1/z(A_o, w, k_o, x) = 1/\left(1 + A_o \frac{\left(\frac{w}{1+\sqrt{-k_o}} - \frac{(wx)^2}{w\left(1+\sqrt{1-\frac{(1+k_o)(wx)^2}{w^2}}\right)}\right)}{\left(\frac{w}{1+\sqrt{-k_o}}\right)}\right)$$

where $k_o$ can be adjusted to correspond to the desired conic profile as described above.

The equation for the normalized, offset, inverted super-Gaussian profile is:

$$c(x) = 1/z(A_o, T_{fwhm}, m, w_o, v_o, v_{sag}, x) =$$

$$1 \bigg/ \left(1 + A_o \left(A_o e^{-\left(\frac{1}{2}\right)\left(\frac{Abs(xw_o)(2Log(2))^{(1/2m)}}{T_{fwhm}}\right)^{2m}} - v_o\right) \bigg/ v_{sag}\right)$$

where, as before, $v_{sag} = A_0 - v_o$ and $$v_o = A_o e^{-\left(\frac{1}{2}\right)\left(\frac{Abs(w_o)(2Log(2))^{(1/2m)}}{T_{fwhm}}\right)^{2m}}.$$

The other parameters are as defined above.

Figure 10:
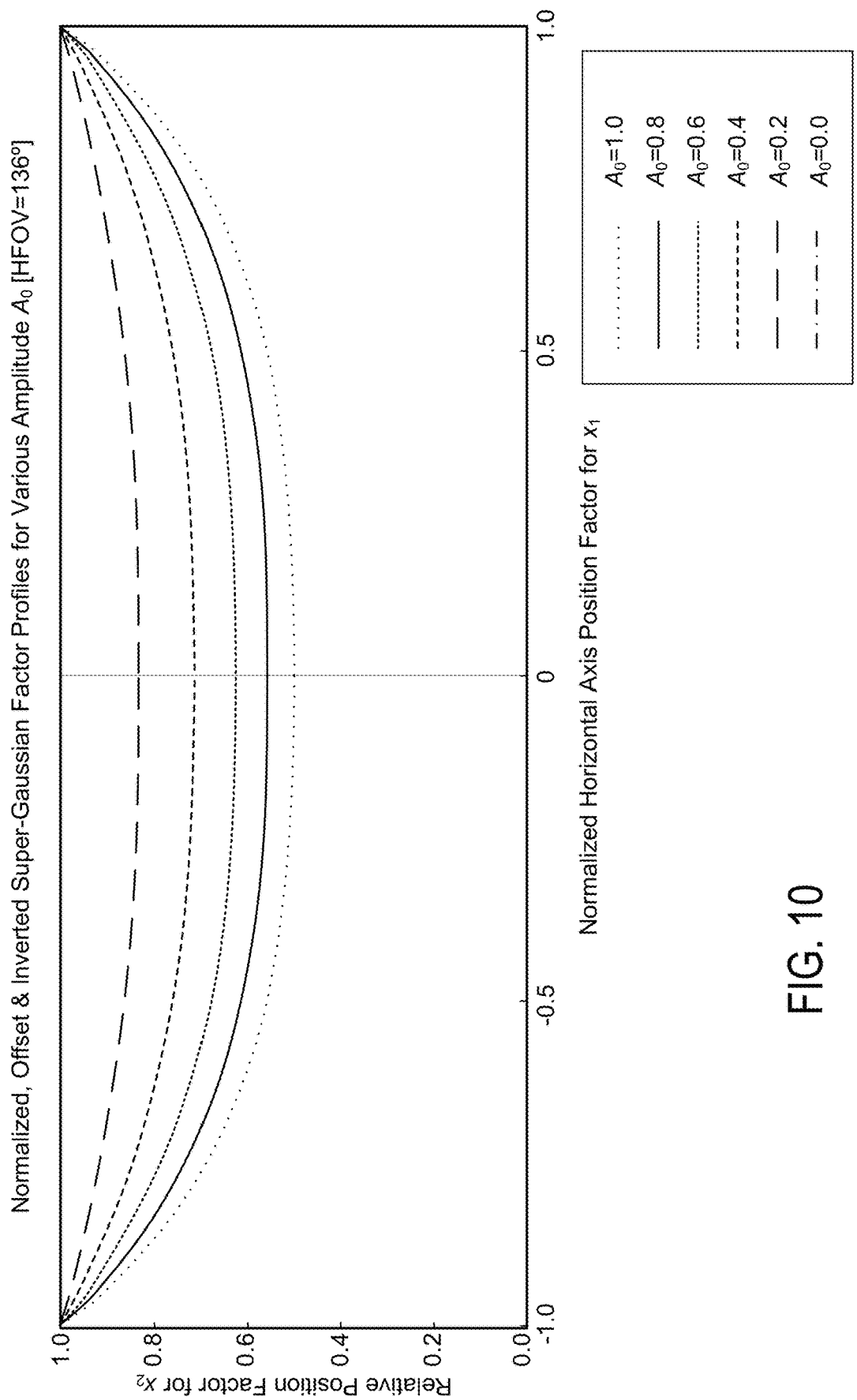
FIG. 10 shows a comparison of relative pixel position factors for super-Gaussian sag profiles that have been normalized, offset-corrected, and inverted.

From these relations, a mapping from $x_1 \to x_2$ is generated and applied within the rectilinear projection plane, thereby providing an indirect mapping of a raw image (e.g., sensor pixels) into a corrected image. For example, as shown in FIG. 10, the inverted super-Gaussian profile gives the $x_2$ relative position factor for a given normalized horizontal axis position factor $x_1$. The normalized, offset, inverted super-Gaussian factor profiles are shown for a HFOV of 136° at various zoom amplitude values $A_o$.

Figure 11:
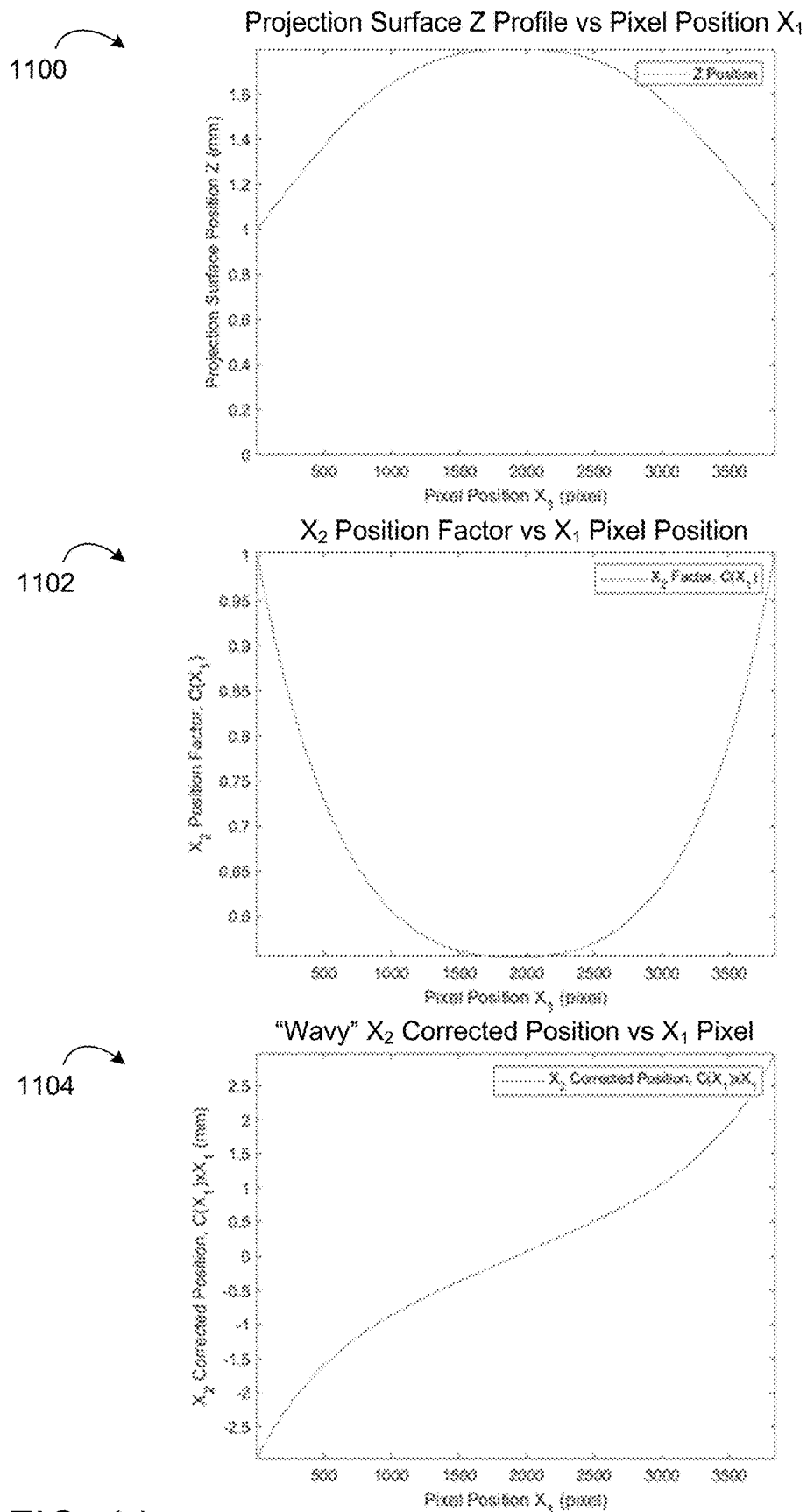
FIG. 11 graphically shows pixel positions shifted based on horizontal position for an example projection depth profile, within the confines of a rectilinear projection plane.

FIG. 11 shows example profile and $x_1 \to x_2$ mappings for a super-Gaussian profile with $A_o = 0.8$. Graph 1100 shows the projection surface Z profile versus pixel position $x_1$. As the zoom amplitude value $A_o = 0.8$, the normalized depth profile extends 0.8× past the nominal radius distance (i.e., $R_o = 1$). Graph 1102 shows the $x_2$ position factor $c(x_1)$ versus the $x_1$ pixel position. In this example, the $x_2$ position factor is smallest for pixel positions $x_1$ located near the center of the image. Graph 1104 shows the $x_2$ corrected position versus the $x_1$ pixel position. The wavy appearance of graph 1104 arises since the pixels at the center of the image (i.e., $x_1 \sim 2000$) spread farther to their $x_2$ positions, hence, the smaller slope. The steeper slope near the edges indicate that the pixels become relatively closer. As a result, the zoom effect is greater for pixels near the center compared to pixels near an edge. Applying $y_1 \to y_2$ mappings, the corrected $y_2$ positions are then determined through relation $$y_2 = y_0 + (c(x)x_1 - x_0)\left(\frac{y_1 - y_0}{x_1 - x_0}\right),$$

where $c(x)$ is a non-linear function, such that $x_2 = c(x)x_1$.

Figure 12A:
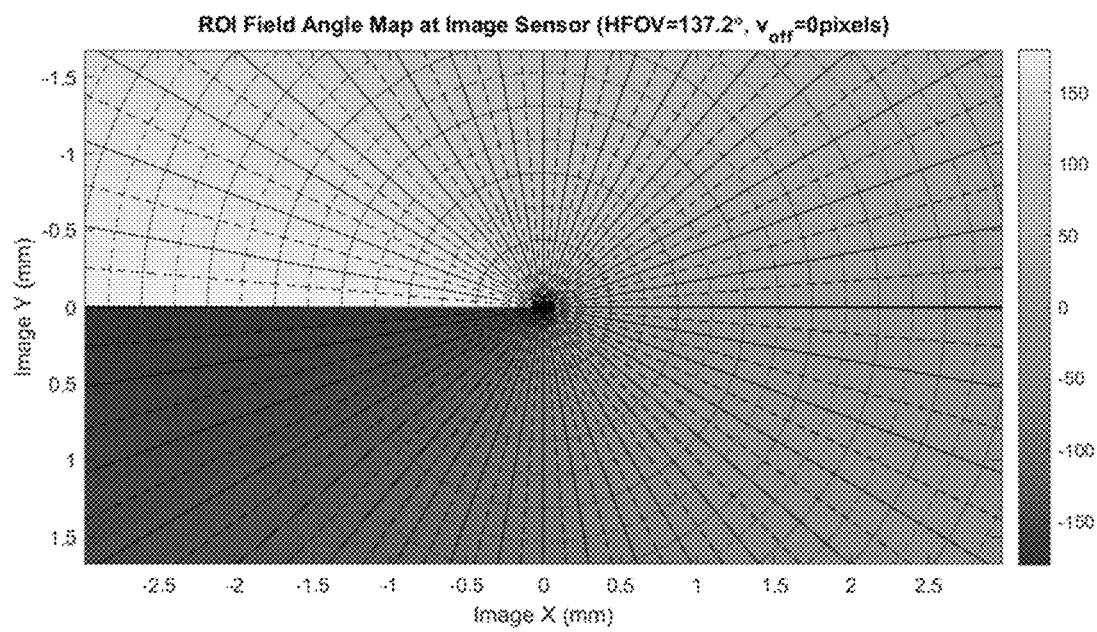
FIGS. 12A-12H show example field angle maps and example rectilinear projections modified with an amplitude function.
Figure 12B:
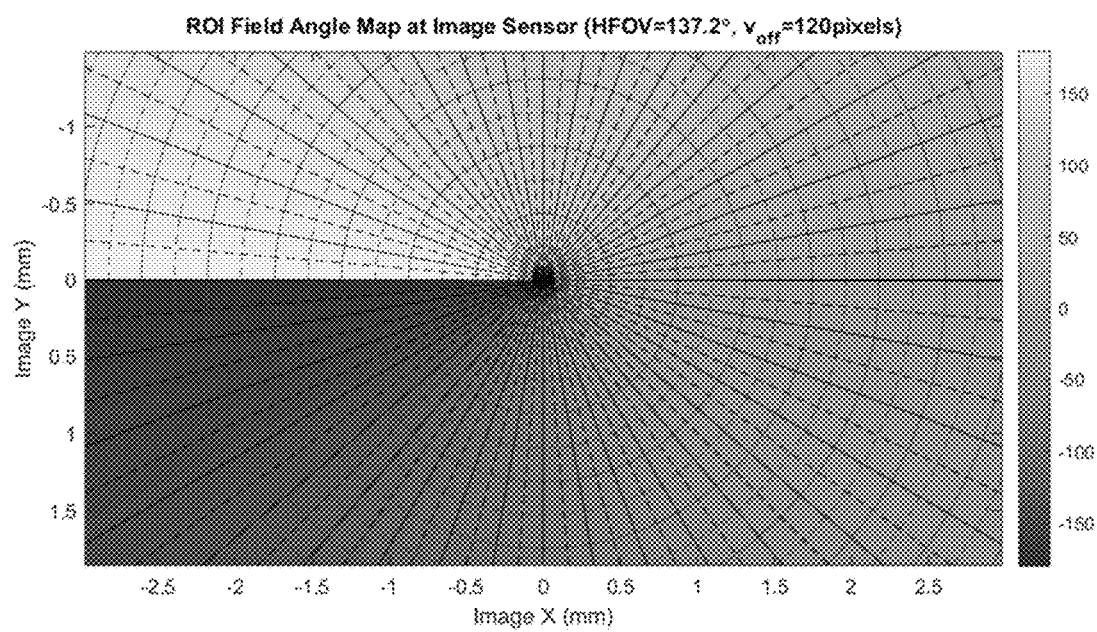
Figure 12C:
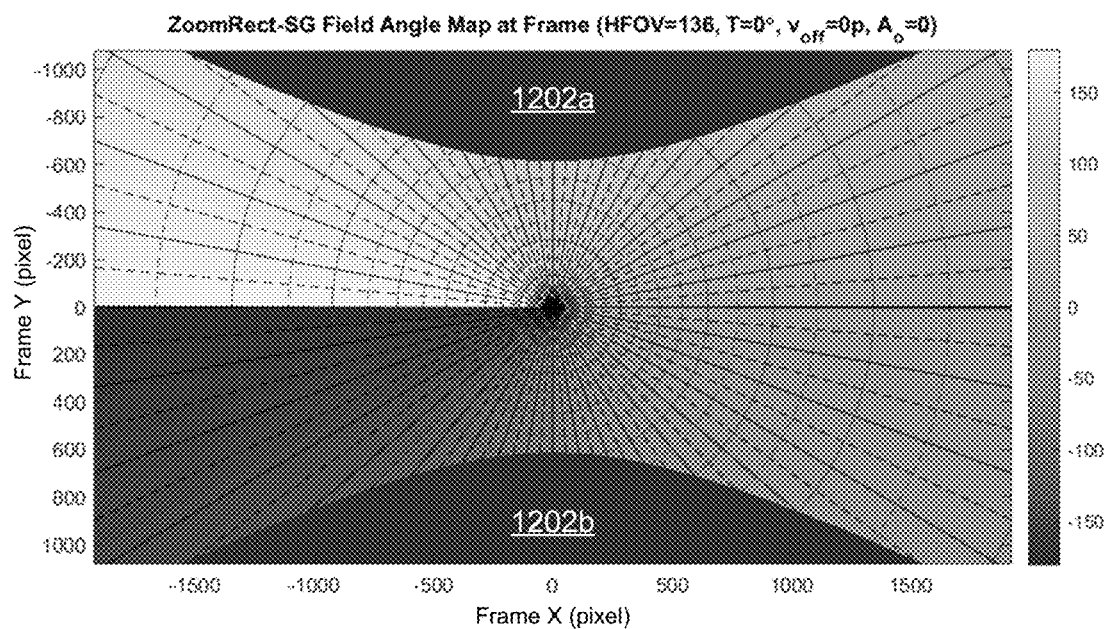
Figure 12D:
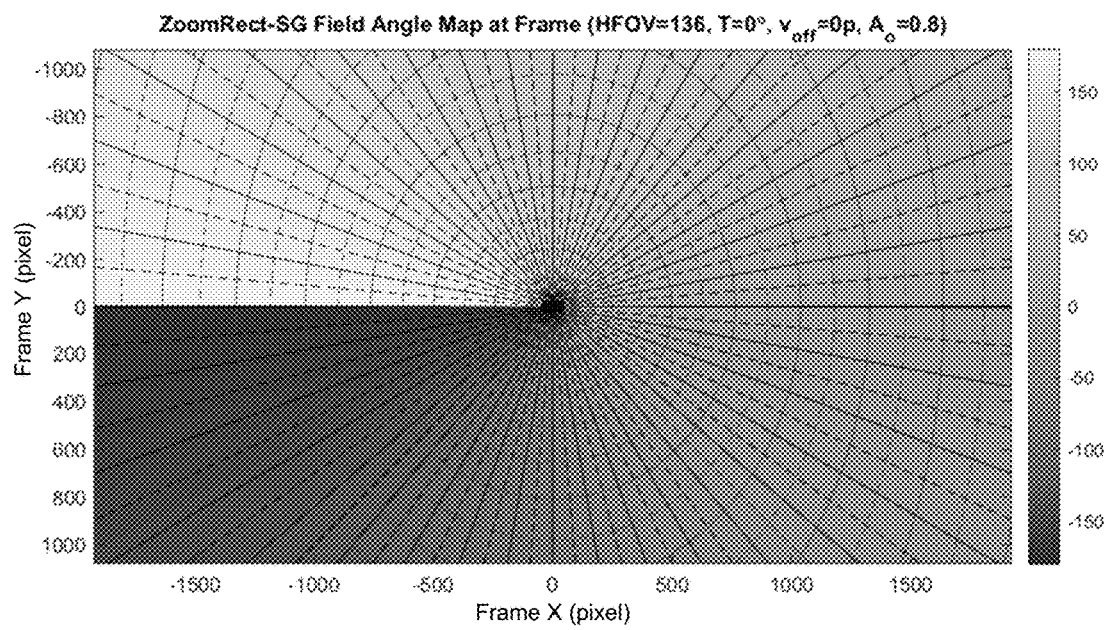
Figure 12E:
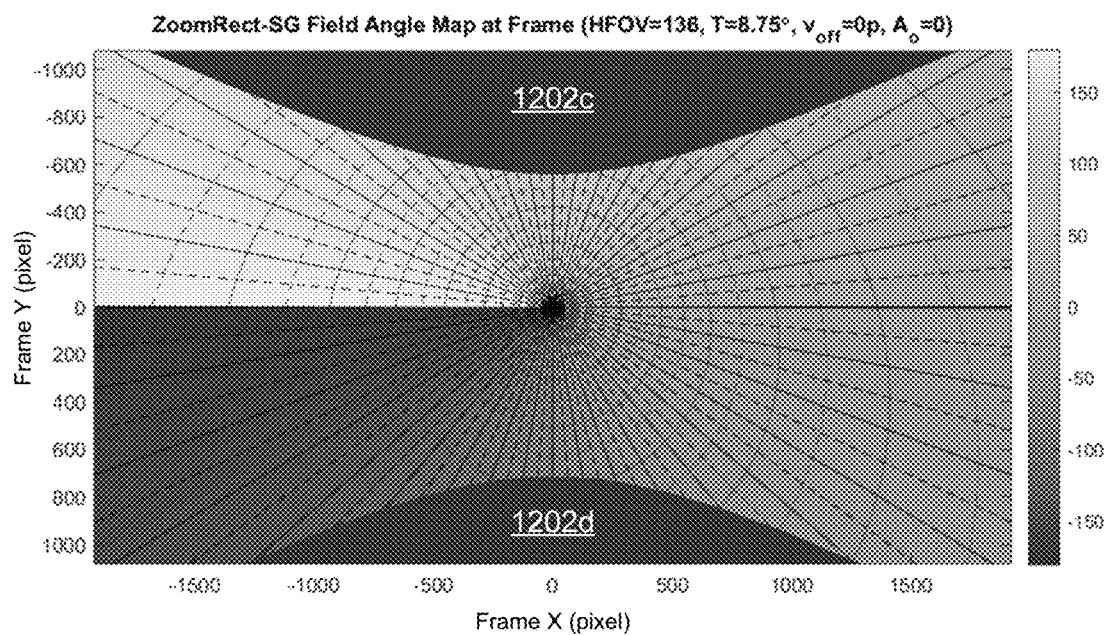
Figure 12F:
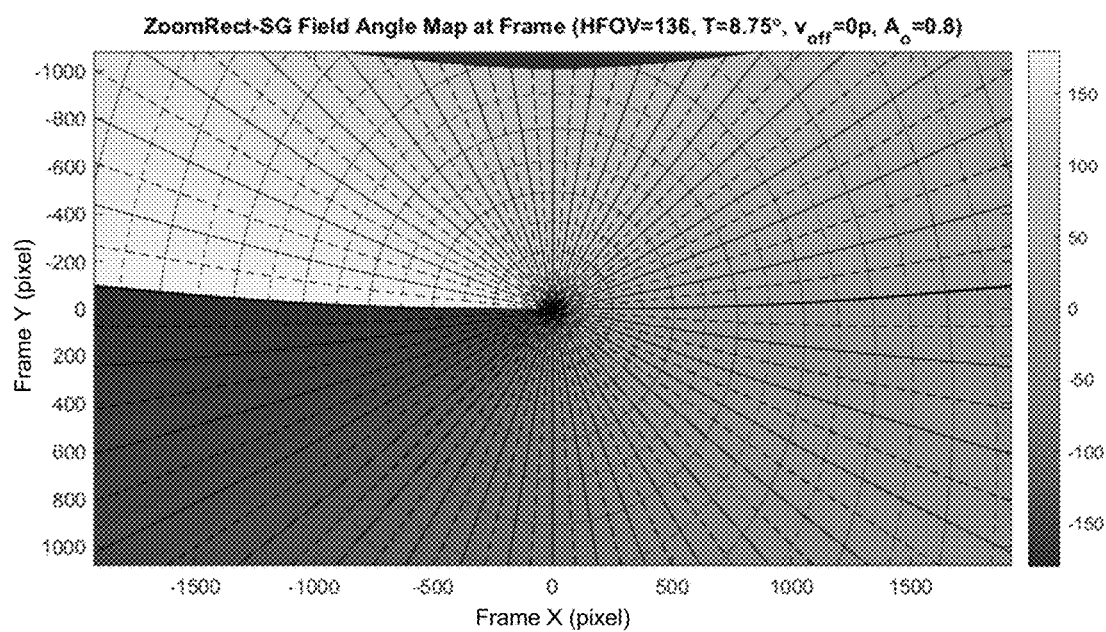
Figure 12G:
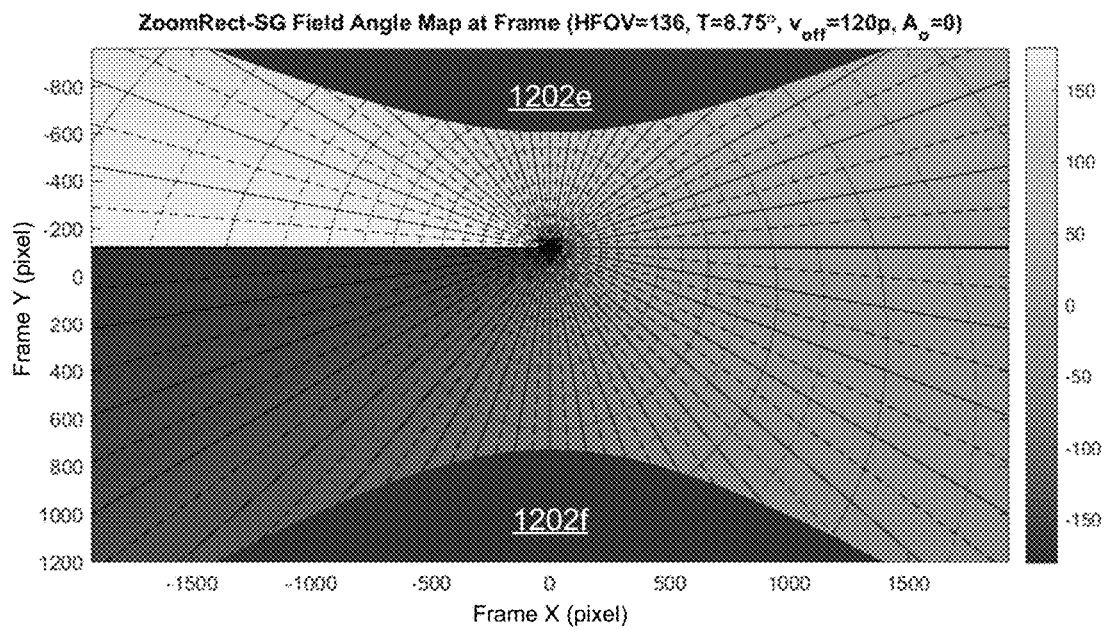
Figure 12H:
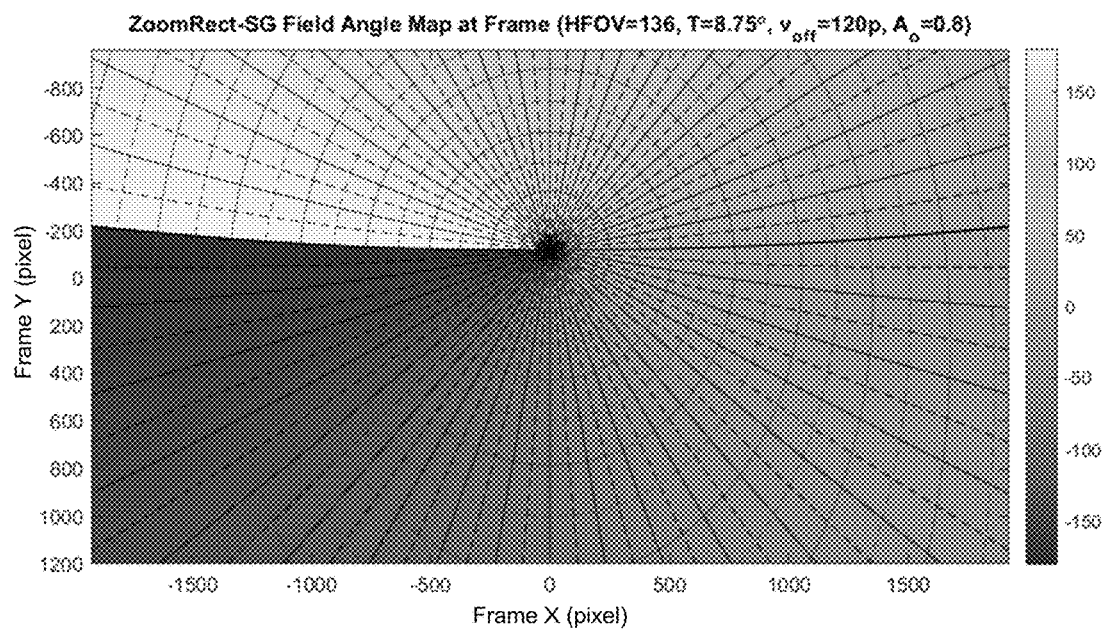

FIGS. 12A-12H shows example field angle maps of a raw input image and example rectilinear projections modified with a zoom amplitude function. FIGS. 12A-12B are field angle maps of raw input images from image sensor or cropped regions of interest (ROI) from image sensor while FIGS. 12C-12H are field angle maps of dewarped output frames which are distortion corrected from raw image input images in FIGS. 12A-12B. For the case of dewarp using zero amplitude ($A_o = 0$) and no tilt compensation (T=0°) the distortion correction is a rectilinear analytical projection, which is a direct projection, as shown in FIG. 12C. Adding tilt compensation, e.g. FIG. 12E, T=8.75°, the distortion correction becomes a tilted rectilinear analytical projection, also a direct projection. The dark regions 1202a-f above and below the field angle contoured regions of FIGS. 12C, 12E, 12G represent angles imaged beyond the ROI input frame edges. To utilize such frames with a given aspect ratio, e.g. 16×9, the HFOV must be reduced to avoid clipping (substantially, as can be seen in FIGS. 12C, 12E, and 12G). However, use of amplitude function ($A_o = 0.8$) as shown in FIGS. 12D, 12F, 12H enables wider HFOV in the dewarped output frame, providing more efficient usage of the pixels. Efficient usage of pixels may help produce higher resolution output images when utilizing wide FOV camera lens optics, e.g. f-theta lens.

Further, in some examples, combinations of tilt compensation with offset imaging may provide efficient use of pixels from the input ROI to maximize and support wide HFOV, while also improving interaction with a large display for scenarios in which the camera is mounted high and above the large display. FIG. 12H shows a field angle map where $A_o = 0.8$, T=8.75° and $v_{off} = 120$ pixels. Comparing FIG. 12H (offset) to FIG. 12F (no offset), it can be seen that including an offset may reduce or eliminate the size of the dark region outside the contour region.

In the illustrations in FIGS. 12A-12H, the radial contour lines represent clocking angles about the optical axis, e.g. −180° to +180°, while the curved contour lines show field angles. Solid lines are increments of 10° and dotted lines are 5° in between the 10° increment contours. While the input ROI has radial symmetry due to lens radial distortion, and on-axis rectilinear analytical projection also has radial symmetry, other dewarp cases exhibit non-rotationally symmetric distortion field angle maps, which enable correction based on scene geometry.

Figure 13:
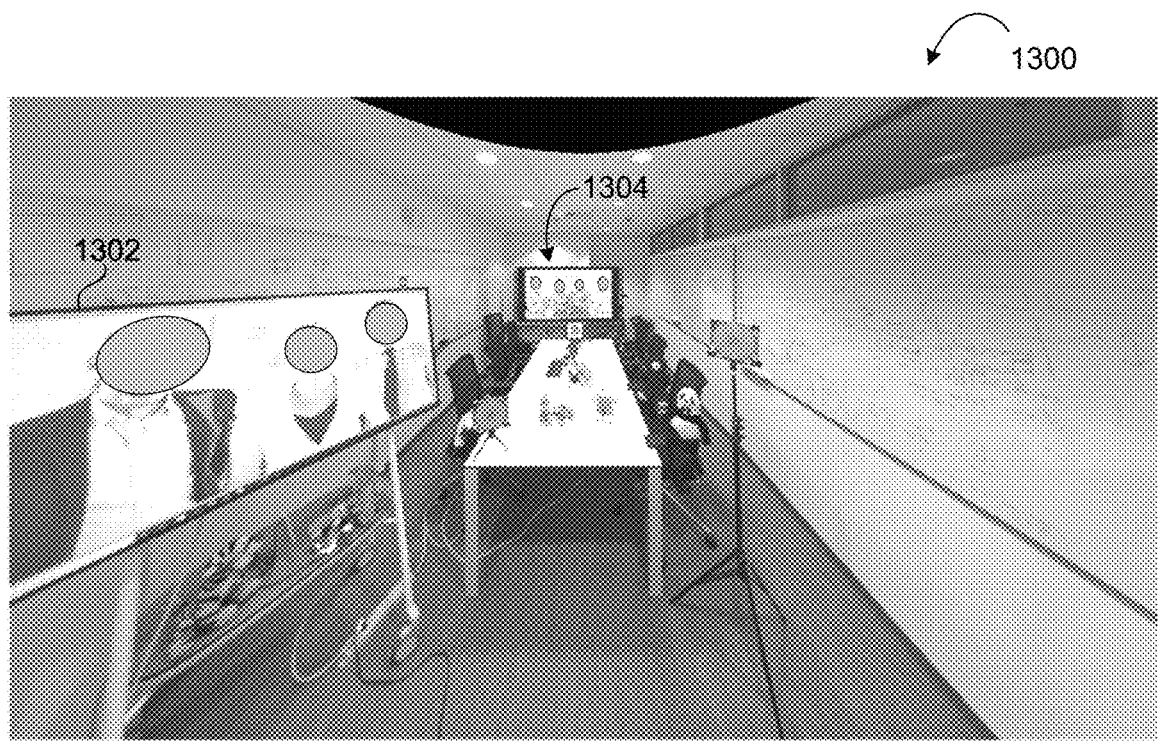
FIG. 13 shows an example image that has been processed by applying a tilted rectilinear projection mapping.
Figure 14:
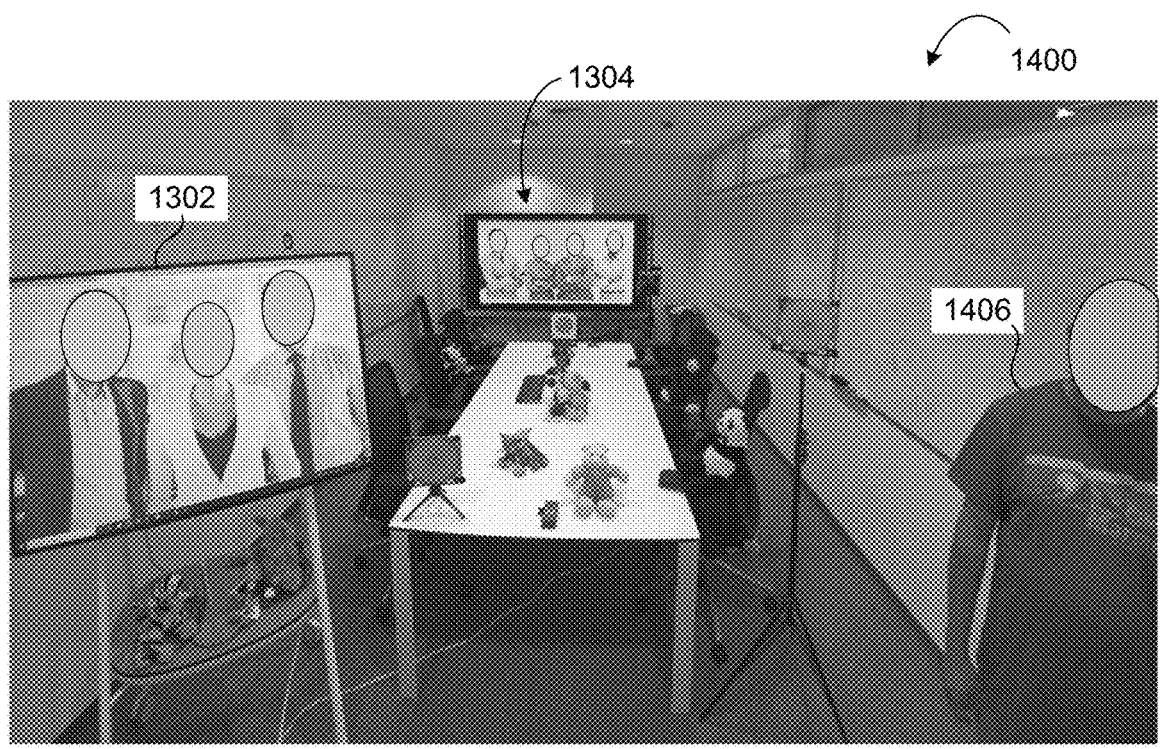
FIG. 14 shows an image of the scene of FIG. 13 that has been processed by applying a tilted rectilinear projection mapping that has been modified by a super-Gaussian-based amplitude function.

FIGS. 13-14 demonstrate the distortion correction and zoom effects that can be achieved using an analytical projection that has been modified with an amplitude function. FIG. 13 depicts an example image 1300 of a conference room scene after applying a tilted rectilinear projection that has not been modified by an amplitude function. The conference scene was imaged using a camera comprising a HFOV of 136°, the camera tilted downwards towards the scene at a 17° tilt angle. The projection mapping applied to the raw image used a rectilinear projection comprising a tilt angle of 17° (i.e., full tilt correction). The rectilinear projection and tilted rectilinear projection preserve all straight-line objects as straight lines in the image. The rectilinear projection modified with amplitude function preserves all straight-line objects as straight lines in image for amplitude set to zero, and preserves all vertical straight line objects as straight lines in image for non-zero amplitudes. While standing persons and vertical line objects appear vertical, some subjects located at higher field angles may appear warped when a displayed frame is viewed at a distance such that the angular subtend of FOV as seen by viewer is not the same as the original camera angular subtend, which may appear as trapezoidal stretching in the case of an ideal rectilinear projection of a wide-angle scene. Display 1302 appears stretched due to trapezoidal distortion and the subjects on display 1302 also appear warped. Furthermore, the subjects on display 1304 appear very small compared to the subjects on display 1302. The size disparities and trapezoidal distortion may make an unsatisfactory viewing experience.

FIG. 14 depicts a wide FOV image 1400 of a similar conference room scene after applying a rectilinear projection that has been modified by an amplitude function. In this example, a rectilinear projection modified by a super-Gaussian amplitude function was applied to the scene. The distortion correction provided by the modified projection mapping helps correct the warping and size disparities present in FIG. 13. The trapezoidal distortion of display 1302 is corrected. The subjects on display 1302 are no longer stretched and appear more natural. A higher zoom effect is achieved for pixels close to the center of the image compared to pixels near the edges, as evidenced by the relative size of the subjects in display 1304 compared to the size of subjects in display 1302. Thus, the modified projection used to obtain image 1400 may achieve a more consistent sizing of subjects across a field of view.

In FIG. 14, the super-Gaussian amplitude function used to modify the rectilinear projection was obtained using the above equations and comprises zoom amplitude of $A_o=0.8$. Additionally, the rectilinear projection comprises a partial tilt correction of 8.5°. Use of a partial tilt correction and/or a zoom amplitude values less than 1.0 may limit warping and foreshortening effects of subjects located close to the camera. For example, subject 1406 may appear compressed or warped if a zoom amplitude of 1.0 is used. Further, certain facial features may appear abnormally enlarged if a full tilt correction is used with the rectilinear projection, as both horizontal FOV and appearance of the apparent pose of subjects positioned at high field angles may be adjusted by zoom amplitude. On the other hand, a zoom amplitude of 1.0 may be appropriate to use in for a different camera FOV and arrangement of subjects, e.g., a radial scene where use of cylindrical projection is undesirable due to curved appearance of some straight-line objects in scene, such that use of amplitude-modified rectilinear projection provides improved appearance of straight-line objects in image. In other examples, any other suitable zoom amplitude and/or tilt parameter may be used. Further, zoom amplitude may be used to balance between a more radial appearance with angle, such as moving toward cylindrical projection appearance, and rectilinear appearance, which suffers from stretching at higher field angles.

Figure 15:
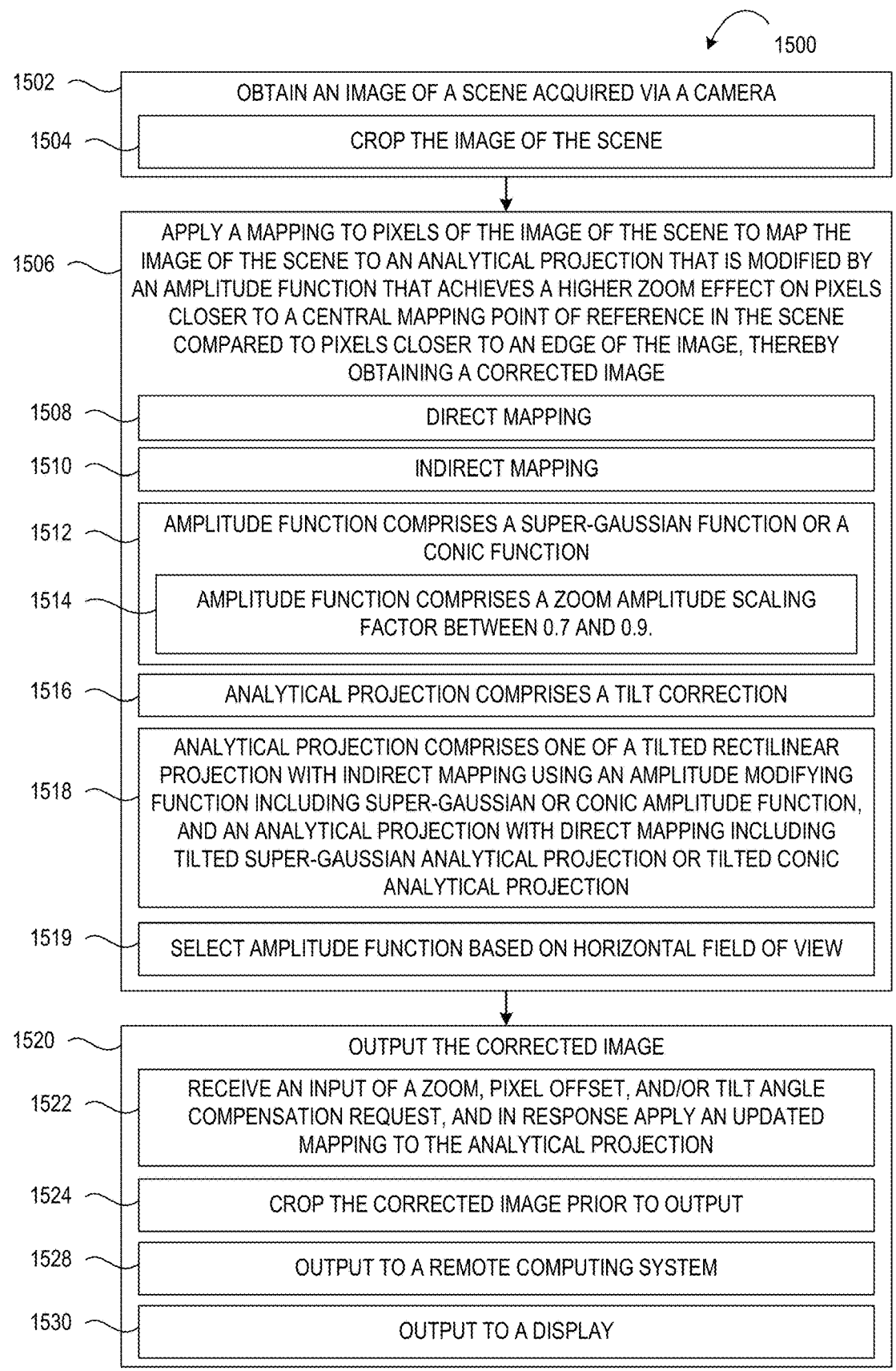
FIG. 15 is a flow diagram depicting an example method for correcting an image by applying an analytical projection mapping that has been modified by an amplitude function.

FIG. 15 shows a flow diagram depicting an example method 1500 for correcting image distortion by mapping an image to an analytical projection that is modified by an amplitude function. For example, method 1500 may be performed by controller 116 of camera 100 shown in FIG. 1, or on a computing device that receive images data from camera 100. At 1502, method 1500 includes obtaining an image of a scene acquired via a camera. For example, the camera may comprise a wide-angle lens and may be tilted at a downward angle. In other examples, the camera may be substantially level and/or have a relatively narrower FOV. In some examples, at 1504, method 1500 comprises cropping the image of the scene.

Method 1500 further comprises, at 1506, applying a mapping to pixels of the image of the scene to map the image of the scene to an analytical projection that is modified by an amplitude function that achieves a higher zoom effect on pixels closer to a central mapping point of reference in the scene compared to pixels closer to an edge of the image, thereby obtaining a corrected image. In some examples, at 1508, the mapping comprises a direct mapping. For example, the amplitude function may be used to modify the projection mapping surface to which the sensor pixels are projected. In other examples, at 1510, the mapping comprises an indirect mapping. For example, the amplitude function may modify the analytical projection via a $x_1 \rightarrow x_2$ mapping within the rectilinear projection plane.

Continuing with method 1500, in some examples, at 1512, the amplitude function comprises one of a super-Gaussian function or a conic function. For example, the conic function may comprise a cylindrical, parabolic, or elliptical profile. In some examples, at 1514, the amplitude function comprises a zoom amplitude between 0.7 and 0.9.

Further, in some examples, at 1516, the analytical projection comprises a tilt correction. In some such examples, the tilt correction is a partial tilt correction. For example, the tilt correction may comprise a tilt parameter that is 0.4 to 0.8 of the camera tilt angle, which may lessen foreshortening effects on some subjects of interest. Further, the tilt correction may be based upon a tilt sensor of the camera. In some examples, at 1518, the analytical projection comprises one of a tilted rectilinear projection with indirect mapping using an amplitude modifying function including super-Gaussian or conic amplitude function, and an analytical projection with direct mapping including tilted super-Gaussian analytical projection or tilted conic analytical projection. In some examples, at 1519 the method comprises selecting an amplitude function based on a horizontal field of view. For example, in response to a change in the HFOV, an updated mapping may be selected and applied based on the updated amplitude function. Further, the updated mapping may include a relationship of parameters defining the amplitude function such that the dewarped appearance may be maintained for a change of HFOV, such that parameters forming the amplitude function are dependent on HFOV. In some examples, a reference HFOV, $HFOV_{ref}$, may be used to maintain amplitude function with change in HFOV, by first forming a reference distance, $$z_{p\_ref} = \left(\frac{1}{\cos(\phi)}\right)\left(\frac{H_{Re}}{\tan\left(\left(\frac{\pi}{180}\right)\left(\frac{HFOV_{ref}}{2}\right)\right)}\right),$$

then forming a nonlinear scaling ratio, $$FOV_{rat} = \left(\frac{HFOV}{2HFOV_{ref}}\right) + \left(\frac{HFOV_{ref}}{2HFOV}\right)\left(\frac{\tan\left(\left(\frac{\pi}{180}\right)\left(\frac{HFOV}{2}\right)\right)}{\tan\left(\left(\frac{\pi}{180}\right)\left(\frac{HFOV_{ref}}{2}\right)\right)}\right).$$

Now the function c(x) may be defined in terms including $FOV_{rat}$ and $x_{edge}$:

$$c(x) = 1/z(A_o, T_{fwhm}, m, w_o, FOV_{rat}, x_{edge}, v_o, v_{sag}, x) =$$

$$1/\left(1 + A_o\left(A_o e^{-\left(\frac{1}{2}\right)\left(\frac{Abs\left(\frac{FOV_{rat}xw_o}{x_{edge}}\right)(2Log(2)^{(1/2m)})}{T_{fwhm}}\right)^{2m}} - v_o\right)/v_{sag}\right),$$

and the mapping becomes $x_2 = c(x)x_1$. In some examples, the analytical projection comprises offset imaging. In some examples, the analytical projection comprises a combination of offset imaging and tilt compensation.

Continuing, at 1520 the method comprises outputting the corrected image. In some examples, at 1522, method 1500 comprises receiving an input of a zoom, pixel offset, and/or tilt angle compensation request, and in response applying an updated mapping to the analytical projection. In some examples, the tilt compensation may be determined by the camera pointing angle, or fraction thereof, as measured by and received from an inertial measurement unit (IMU) onboard the camera. In some examples, HFOV and zoom amplitude and vertical pixel offset and tilt compensation angle used in mesh generation may be determined by camera tilt angle, thus enabling ability to maximize HFOV for a given set of mesh generation input parameters. In some examples, a predetermined look-up table (LUT) of correction mesh arrays may be stored onboard camera such that a mesh is selected based on input camera IMU tilt angle, wherein the correction meshes may be generated based on specific combinations of parameters including HFOV, zoom amplitude $A_o$, vertical pixel offset $v_{off}$, and tilt compensation angle. In some examples, tilt compensation angle may be pre-determined by mechanical mounting of the camera device to an interactive display device, and/or known parameters concerning a specific mount or mount location between camera device and interactive display device. In some examples, at 1524, the corrected image is cropped prior to output. Further, in some examples, the corrected image is output to a remote computing device at 1528. For example, the corrected image may be output to a videoconferencing system of a remote user, or to a distributed computing system hosting a videoconferencing service. In other examples, at 1530, the corrected image is output to a local display.

In some examples, the methods and processes described herein may be tied to a computing system of one or more computing devices. In particular, such methods and processes may be implemented as a computer-application program or service, an application-programming interface (API), a library, and/or other computer-program product.

Figure 16:
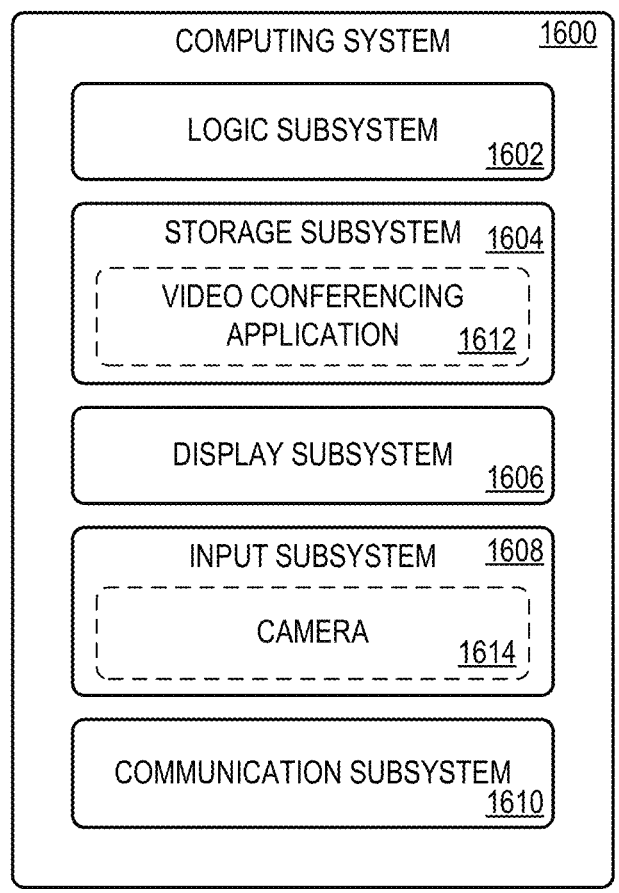
FIG. 16 schematically shows an example computing system.

FIG. 16 schematically shows a block diagram of an example computing system 1600 that can enact one or more of the methods and processes described above. Computing system 1600 is shown in simplified form. Computing system 1600 may take the form of one or more personal computers, server computers, tablet computers, home-entertainment computers, network computing devices, gaming devices, mobile computing devices, mobile communication devices (e.g., smart phone), and/or other computing devices. For example, computing system 1600 may represent controller 116, camera 100, a computing device incorporating camera 100 (e.g., a videoconferencing system having an integrated camera), or any other suitable computing system.

Computing system 1600 includes a logic subsystem 1602 and a storage subsystem 1604. Computing system 1600 may optionally include a display subsystem 1606, input subsystem 1608, communication subsystem 1610, and/or other components not shown in FIG. 16.

Logic subsystem 1602 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 1604 includes one or more physical devices configured to hold instructions executable by the logic subsystem to implement the methods and processes described herein. When such methods and processes are implemented, the state of storage subsystem 1604 may be transformed—e.g., to hold different data. For example, storage subsystem 1604 may store instruction executable to apply an analytical projection that has been modified by an amplitude function, as described above. Further, storage subsystem 1604 may store applications executable by logic subsystem 1602 such as a videoconferencing application 1612 that receives corrected images for transmission and/or display.

Storage subsystem 1604 may include removable and/or built-in devices. Storage subsystem 1604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1604 may include volatile, nonvolatile, dynamic, static, read/write, read-only, random-access, sequential-access, location-addressable, file-addressable, and/or content-addressable devices.

It will be appreciated that storage subsystem 1604 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1602 and storage subsystem 1604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1600 implemented to perform a particular function. In some cases, a module, program, or engine may be instantiated via logic subsystem 1602 executing instructions held by storage subsystem 1604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1606 may be used to present a visual representation of data held by storage subsystem 1604. This visual representation may take the form of a graphical user interface (GUI). As the herein described methods and processes change the data held by the storage subsystem, and thus transform the state of the storage subsystem, the state of display subsystem 1606 may likewise be transformed to visually represent changes in the underlying data. Display subsystem 1606 may include one or more display devices utilizing virtually any type of technology. Such display devices may be combined with logic subsystem 1602 and/or storage subsystem 1604 in a shared enclosure, or such display devices may be peripheral display devices.

When included, input subsystem 1608 may comprise or interface with one or more user-input devices such as a keyboard, mouse, touch screen, or game controller. In some embodiments, input subsystem 1608 may comprise an image sensor such as camera 1614 from which images are obtained and corrected via an applied projection mapping, as described above. For example, camera 1614 may represent camera 100 and may comprise a wide-angle lens. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1610 may be configured to communicatively couple computing system 1600 with one or more other computing devices. Communication subsystem 1610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1600 to send and/or receive messages to and/or from other devices via a network such as the Internet.

Another example provides a computing device comprising a logic subsystem, and a storage subsystem holding instructions executable by the logic subsystem to receive an image of a scene as acquired by an image sensor, apply a mapping to the image of the scene that maps pixels of the image to projected pixels on an analytical projection that is modified by an amplitude function such that the analytical projection achieves a higher zoom effect on pixels closer to a center of the image compared to pixels closer to an edge of the image, thereby obtaining a corrected image, and output the corrected image. In some such examples, the analytical projection comprises a rectilinear projection. Additionally or alternatively, in some examples the amplitude function comprises one of a super-Gaussian function, a conic function, a parabolic function, or a cylindrical function. Additionally or alternatively, in some examples, the amplitude function comprises a super-Gaussian function comprising an amplitude scaling factor between 0.7 and 0.9. Additionally or alternatively, in some examples the mapping comprises a direct mapping. Additionally or alternatively, in some examples the mapping comprises an indirect mapping. Additionally or alternatively, in some examples the instructions are further executable to receive one or more of an input of a zoom request, an input of a pixel offset request, or an input of a tilt angle compensation request, and in response apply an updated mapping to the analytical projection. Additionally or alternatively, in some examples the computing device further comprises the image sensor. Additionally or alternatively, in some examples the image of the scene comprises a horizontal field of view between 700 and 145°. Additionally or alternatively, in some examples the analytical projection is modified by applying a nonlinear function c(x) to a grid that maps $(x_1, y_1)$ to $(x_2, y_2)$ by $$(x_2, y_2) = \left(c(x)x_1, y_0 + (c(x)x_1 - x_0)\left(\frac{y_1 - y_0}{x_1 - x_0}\right)\right)$$

wherein $(x_1, y_1)$ is a pixel position in the analytical projection, $(x_2, y_2)$ is a pixel position in the modified projection, $(x_0, y_0)$ is a central mapping point of reference in the image of the scene, and c(x) comprises the amplitude function.

Another example provides a method enacted on a computing device, the method comprising obtaining an image of a scene acquired via a camera, applying a mapping to pixels of the image of the scene to map the image of the scene to an analytical projection that is modified by an amplitude function that achieves a higher zoom effect on pixels closer to a central mapping point of reference in the scene compared to pixels closer to an edge of the image, thereby obtaining a corrected image, and outputting the corrected image. In some such examples, the mapping comprises a direct mapping. Additionally or alternatively, in some examples the mapping comprises an indirect mapping. Additionally or alternatively, in some examples the method further comprises receiving an input of one or more of a zoom request, a pixel offset request, or a tilt angle compensation request, and in response applying an updated mapping to the analytical projection. Additionally or alternatively, in some examples the amplitude function comprises one of a super-Gaussian function or a conic function. Additionally or alternatively, in some examples the analytical projection comprises a tilt correction that is based upon a camera tilt angle at which the image of the scene was acquired. Additionally or alternatively, in some examples the method further comprises selecting an updated amplitude function based on a change in a horizontal field of view, and applying an updated mapping based on the updated amplitude function.

Another example provides a videoconferencing system comprising a camera, a logic subsystem, and a storage subsystem holding instructions executable by the logic subsystem to receive an image of a scene from the camera, apply a mapping to the image to map pixels of the image to projected pixels on a rectilinear projection that is modified by an amplitude function such that the rectilinear projection achieves a higher zoom effect on pixels closer to a center of the image compared to pixels closer to an edge of the image, thereby obtaining a corrected image, and output the corrected image for display. In some such examples the videoconferencing system further comprises a display. Additionally or alternatively, in some examples the rectilinear projection is based at least in part on a tilt angle of the camera relative to the scene.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a logic subsystem; and
a storage subsystem holding instructions executable by the logic subsystem to:
receive an image of a scene as acquired by an image sensor;
apply a mapping to the image of the scene that maps pixels of the image to projected pixels on an analytical projection that is modified by an amplitude function such that the analytical projection achieves a higher zoom effect on pixels closer to a center of the image compared to pixels closer to an edge of the image, thereby obtaining a corrected image, wherein, for a mapping point in the analytical projection, the amplitude function modifies the mapping point to an updated projection point by scaling a distance from a central mapping point of reference to the mapping point based on the amplitude function; and
output the corrected image.

2. The computing device of claim 1, wherein the analytical projection comprises a rectilinear projection.

3. The computing device of claim 1, wherein the amplitude function comprises one of a super-Gaussian function, a conic function, a parabolic function, or a cylindrical function.

4. The computing device of claim 3, wherein the amplitude function comprises a super-Gaussian function comprising an amplitude scaling factor between 0.7 and 0.9.

5. The computing device of claim 1, wherein the mapping comprises a direct mapping.

6. The computing device of claim 1, wherein the mapping comprises an indirect mapping.

7. The computing device of claim 1, wherein the instructions are further executable to receive one or more of an input of a zoom request, an input of a pixel offset request, or an input of a tilt angle compensation request, and in response apply an updated mapping to the analytical projection.

8. The computing device of claim 1, further comprising the image sensor.

9. The computing device of claim 1, wherein the image of the scene comprises a horizontal field of view between 70° and 145°.

10. The computing device of claim 1, wherein the analytical projection is modified by applying a nonlinear function $c(x)$ to a grid that maps $(x_1, y_1)$ to $(x_2, y_2)$ by:

$$(x_2, y_2) = \left(c(x)x_1, y_0 + (c(x)x_1 - x_0)\left(\frac{y_1 - y_0}{x_1 - x_0}\right)\right)$$

wherein $(x_1, y_1)$ is a pixel position in the analytical projection, $(x_2, y_2)$ is a pixel position in the modified projection, $(x_0, y_0)$ is a central mapping point of reference in the image of the scene, and $c(x)$ comprises the amplitude function.

11. Enacted on a computing device, a method comprising:
obtaining an image of a scene acquired via a camera;
applying a mapping to pixels of the image of the scene to map the image of the scene to an analytical projection that is modified by an amplitude function that achieves a higher zoom effect on pixels closer to a central mapping point of reference in the scene compared to pixels closer to an edge of the image, thereby obtaining a corrected image, wherein, for a mapping point in the analytical projection, the amplitude function modifies the mapping point to an updated projection point by scaling a distance from the central mapping point of reference to the mapping point based on the amplitude function; and
outputting the corrected image.

12. The method of claim 11, wherein the mapping comprises a direct mapping.

13. The method of claim 11, wherein the mapping comprises an indirect mapping.

14. The method of claim 11, further comprising receiving an input of one or more of a zoom request, a pixel offset request, or a tilt angle compensation request, and in response applying an updated mapping to the analytical projection.

15. The method of claim 11, wherein the amplitude function comprises one of a super-Gaussian function or a conic function.

16. The method of claim 11, wherein the analytical projection comprises a tilt correction that is based upon a camera tilt angle at which the image of the scene was acquired.

17. The method of claim 11, further comprising selecting an updated amplitude function based on a change in a horizontal field of view, and applying an updated mapping based on the updated amplitude function.

18. A videoconferencing system comprising:
a camera;
a logic subsystem; and
a storage subsystem holding instructions executable by the logic subsystem to:
receive an image of a scene from the camera,
apply a mapping to the image to map pixels of the image to projected pixels on a rectilinear projection that is modified by an amplitude function such that the rectilinear projection achieves a higher zoom effect on pixels closer to a center of the image compared to pixels closer to an edge of the image, thereby obtaining a corrected image, wherein, for a mapping point in the rectilinear projection, the amplitude function modifies the mapping point to an updated projection point by scaling a distance from a central mapping point of reference to the mapping point based on the amplitude function, and
output the corrected image for display.

19. The videoconferencing system of claim 18, further comprising a display.

20. The videoconferencing system of claim 18, wherein the rectilinear projection is based at least in part on a tilt angle of the camera relative to the scene.

* * * * *